US012478557B2

(12) United States Patent
Omura

(10) Patent No.: US 12,478,557 B2
(45) Date of Patent: Nov. 25, 2025

(54) TABLET CASSETTE

(71) Applicant: TOSHO, INC., Tokyo (JP)

(72) Inventor: Yoshihito Omura, Tokyo (JP)

(73) Assignee: TOSHO, INC., Tokyo (JP)

( * ) Notice: Subject to any disclaimer, the term of this patent is extended or adjusted under 35 U.S.C. 154(b) by 555 days.

(21) Appl. No.: 17/908,666

(22) PCT Filed: Mar. 2, 2021

(86) PCT No.: PCT/JP2021/007893
§ 371 (c)(1),
(2) Date: Sep. 1, 2022

(87) PCT Pub. No.: WO2021/177285
PCT Pub. Date: Sep. 10, 2021

(65) Prior Publication Data

US 2023/0157929 A1 May 25, 2023

(30) Foreign Application Priority Data

Mar. 3, 2020 (JP) ................................ 2020-035629
Mar. 17, 2020 (JP) ................................ 2020-047019

(51) Int. Cl.
*A61J 3/00* (2006.01)
*A61J 1/03* (2023.01)
*G07F 17/00* (2006.01)

(52) U.S. Cl.
CPC . *A61J 3/00* (2013.01); *A61J 1/03* (2013.01); *G07F 17/0092* (2013.01)

(58) Field of Classification Search
CPC .................................................. G07F 17/0092
See application file for complete search history.

(56) References Cited

U.S. PATENT DOCUMENTS 3,128,011 A * 4/1964 Bleiman ................ G07F 11/44 221/68
2004/0176873 A1* 9/2004 Kim ....................... G07F 11/62 700/231

(Continued)

FOREIGN PATENT DOCUMENTS

EP 2 664 316 A1 11/2013
JP 2005-192702 7/2005

(Continued)

OTHER PUBLICATIONS

International Search Report, Date of mailing: May 11, 2021, International Application No. PCT/JP2021/007893, 2 pages.

(Continued)

*Primary Examiner* — Gene O Crawford
*Assistant Examiner* — Kelvin L Randall, Jr.
(74) *Attorney, Agent, or Firm* — Rankin, Hill & Clark LLP

(57) ABSTRACT

A tablet cassette includes a tablet container for containing tablets in a random manner and a rotor provided therein and having a plurality of tablet receiving portions, and allows tablets, which have fallen into the tablet receiving portions through axial rotation of the rotor, to successively fall down through a discharge port at the bottom portion of the tablet container. The rotor includes a circumferential expansion-contraction mechanism, a radial expansion-contraction mechanism, and a pressing member externally mounted on a rotary shaft that penetrates a bottom wall portion of the tablet container. The circumferential expansion-contraction mechanism allows the plurality of tablet receiving portions to be expanded and contracted in the circumferential direction in conjunction with each other. The radial expansion-contraction mechanism allows the tablet receiving portions (Continued)

to be individually expanded and contracted by individually moving a plurality of sliding members in the radial direction.

16 Claims, 17 Drawing Sheets

(56) References Cited

U.S. PATENT DOCUMENTS

| | | | | |
|---|---|---|---|---|
| 2007/0150092 | A1 | 6/2007 | Ohmura | |
| 2014/0014678 | A1 * | 1/2014 | Yuyama | B65D 83/0409 221/277 |
| 2014/0174271 | A1 | 6/2014 | Omura et al. | |
| 2018/0161247 | A1 | 6/2018 | Koike et al. | |
| 2019/0114875 | A1 | 4/2019 | Yoshida et al. | |
| 2021/0007936 | A1 * | 1/2021 | Koike | A61J 3/00 |
| 2021/0022960 | A1 | 1/2021 | Omura | |
| 2021/0308015 | A1 | 10/2021 | Omura | |

FOREIGN PATENT DOCUMENTS

| | | |
|---|---|---|
| JP | 2013-39237 | 2/2013 |
| JP | 2019-141330 | 8/2019 |
| WO | 2012/096328 | 7/2012 |
| WO | 2020/138116 | 7/2020 |

OTHER PUBLICATIONS

Extended European Search Report dated Feb. 8, 2024, Application No. 21765322.9; 13 pages.

* cited by examiner

TABLET CASSETTE

TECHNICAL FIELD

The present invention relates to a tablet cassette that forms a driven portion in a tablet feeder for automating dispensing of medicines performed in hospitals, pharmacies, etc., and in particular to a tablet cassette including a tablet container for containing tablets and a rotor provided in the tablet container to allow the tablets to successively fall down through a discharge port of the tablet container while aligning the tablets around the rotor when the rotor is rotationally driven.

BACKGROUND ART

A tablet feeder according to the related art (see FIG. 1 of Patent Document 1, FIG. 1 of Patent Document 2, and FIG. 5 of Patent Document 3, for example) includes a drive portion fixed and arranged on a drawing shelf of a tablet dispensing apparatus, a body portion of a tablet splitting apparatus, etc. for power supply and control, and a tablet cassette removably mounted to the drive portion to facilitate tablet replenishment work etc. In the tablet feeder, a large number of tablets are contained in a random manner in a tablet containing space of the tablet container of the tablet cassette, and the drive portion is caused to operate intermittently or continuously, as necessary, to feed the tablets one by one from the tablet cassette. The tablet feeder successively discharges the plurality of tablets by moving the tablets from top to bottom to the discharge port, which allows the tablets to fall down one by one.

In the tablet cassette according to the related art, a large number of blade-shaped partition walls are formed at equal intervals in the circumferential direction on the outer peripheral surface of the rotor to project into an annular gap in which the tablets are to be aligned, in order to divide the annular gap into spaces each corresponding to one tablet. The spaces between adjacent partition walls serve as tablet receiving portions each for containing one tablet having fallen from above the rotor.

RELATED-ART DOCUMENT

Patent Document

Patent Document 1: Japanese Patent Application Publication No. 2005-192702

Patent Document 2: Japanese Patent Application Publication No. 2013-039237

Patent Document 3: Japanese Patent Application Publication No. 2019-141330

SUMMARY OF INVENTION

Technical Problem

In such a tablet cassette, the dimensions of the tablet receiving portions cannot be changed. Thus, the inventor of the present application has proposed a tablet cassette configured to enable the dimensions of tablet receiving portions for containing tablets one by one to be increased and reduced.

Specifically, Japanese Patent Application No. 2018-241162, which is a prior application of the present application, proposes a tablet cassette including a rotor including a circumferential expansion-contraction mechanism externally mounted on a rotary shaft to expand and contract a plurality of tablet receiving portions in the circumferential direction in conjunction with each other, and a radial expansion-contraction mechanism operable to expand and contract the tablet receiving portions in the radial direction.

In the tablet cassette, however, a link structure of the rotor is complicated, since not only the circumferential dimensions of the plurality of tablet receiving portions are increased and reduced but also the radial dimensions of the plurality of tablet receiving portions are increased and reduced together in an interlocking manner. Therefore, a problem with increased manufacturing costs has been caused by an increase in the number of components and miniaturization of members. Thus, it is a technical issue to implement a tablet cassette that can be manufactured at a reduced cost even if the functional usability of the tablet cassette is degraded because of the reduction in the manufacturing cost.

An object of the present invention is to provide a tablet cassette that includes a reduced number of components, that does not require miniaturization of components, and that can be manufactured inexpensively compared to the related art.

An additional object is to provide a tablet cassette capable of resolving stagnation of tablets in the tablet cassette.

Solution to Problem

In order to facilitate understanding, the components of the present invention will be described below using numerals used in the drawings. However, the present invention should not be construed as being limited to the embodiment illustrated in the drawings.

The present invention provides a tablet cassette including: a tablet container 20 having a tablet containing space 22 therein for containing a plurality of tablets in a random manner, the tablet container 20 including a bottom wall portion 25 formed with a discharge port 28 to allow the plurality of tablets in the tablet containing space 22 to fall down one by one; a rotary shaft 41 having an axial line extending in a direction orthogonal to the bottom wall portion 25 of the tablet container 20; and a rotor 40 operable to rotate about the axial line in the tablet containing space 22 of the tablet container 20 along with rotation of the rotary shaft 41. The rotor 40 includes a plurality of tablet receiving portions 67 configured to receive the tablets one by one and allow the tablets to pass therethrough to the discharge port 28. The plurality of tablet receiving portions 67 each include a radially opening portion 67A that opens in a radial direction of the rotary shaft, a pair of axially opening portions 67B, 67C that open on both sides in an axial direction in which the axial line extends, a facing wall portion 94A that faces the radially opening portion, and a pair of side wall portions 61, 71 that face each other in a circumferential direction of the rotary shaft 41. The rotor 40 that is used in the present invention includes a circumferential expansion-contraction mechanism 59 externally mounted on the rotary shaft 41 to expand and contract the plurality of tablet receiving portions 67 in the circumferential direction in conjunction with each other, and a radial expansion-contraction mechanism 90. The radial expansion-contraction mechanism 90 is externally mounted on the rotary shaft, and includes a plurality of sliding members 94 respectively provided for the plurality of tablet receiving portions and a slide allowing holding member (91, 97). The plurality of sliding members 94 each include the facing wall portion 94A at one end thereof and are slidable in the radial direction of the rotary shaft 41 to individually move the facing wall portion 94A in the radial direction. The slide allowing holding member (91, 97) is configured to hold the plurality of sliding members 94 to be slidable in the radial direction. In the present invention, a constraining mechanism (47, 48, 50) is provided, and is configured to disable the plurality of sliding members 94 to slide with respect to the slide allowing holding member (91, 97) with the circumferential expansion-contraction mechanism 59 and the radial expansion-contraction mechanism 90 being externally mounted on the rotary shaft 41.

In the present invention, to embody the function to expand and contract the tablet receiving portions, and the circumferential expansion-contraction mechanism maintains the function to adjust the plurality of tablet receiving portions in conjunction with each other. But the radial expansion-contraction mechanism individually adjusts the tablet receiving portions, rather than maintaining the function to adjust the tablet receiving portions in conjunction with each other. As a result, the configuration of the link mechanism is simplified with no need for a complicated link mechanism which tends to be complicated and miniaturized. On the other hand, radial expansion and contraction of the tablet receiving portions is individually adjusted by sliding the plurality of sliding members 94, and thus can be conveniently adjusted even with a small force. In the present invention, the constraining mechanism (47, 48, 50) is provided to be configured to disable the plurality of sliding members 94 to slide with respect to the slide allowing holding member (91, 94) after individual adjustment is all finished, which can easily prevent a change in the state of adjustment.

Preferably, the constraining mechanism (47, 48, 50) includes a pressing member 47 to be pressed against the plurality of sliding members 94 to hinder sliding of the plurality of sliding members 94. The state of expansion and contraction of the tablet receiving portions is fixed by simply pressing the pressing member 47 against the radial expansion-contraction mechanism. Therefore, the plurality of sliding members 94 can be collectively fixed, even if the plurality of sliding members 94 are individually adjusted.

The radial expansion-contraction mechanism 90 is disposed on the circumferential expansion-contraction mechanism 59 such that the plurality of facing wall portions 94A are inserted into the plurality of tablet receiving portions 67. The constraining mechanism (47, 48, 50) further includes a cap member 50 mounted to the rotary shaft to press the pressing member 47 disposed on the radial expansion-contraction mechanism 90 toward the plurality of sliding members 94. With this configuration, the pressing member 47 can be pressed against the plurality of sliding members 97 by mounting the cap member 50, and thus the constraining mechanism can be easily mounted through assembling the rotor.

Preferably, the slide allowing holding member (91, 97) includes a pair of sandwiching members (91, 97) configured to hold the plurality of sliding members 94 by sandwiching sliding portions of the sliding members 94 at both sides in the axial direction. Preferably, one of the pair of sandwiching members (91, 97) located on the pressing member 47 side includes a plurality of through grooves 92 formed to expose a part 95 of the plurality of sliding members 94 to be able to contact the pressing member 47. With this configuration, the radial expansion-contraction mechanism 90 which includes the plurality of sliding members 94 can be handled as a single unit, even when the radial expansion-contraction mechanism 90 is separated from the rotary shaft and the circumferential expansion-contraction mechanism 59. As a result, radial expansion and contraction can be easily individually adjusted by sliding the plurality of sliding members 94.

A protrusion 95 may be provided at the other end of each of the plurality of sliding members 94, the protrusion 95 being configured to be located in a corresponding one of the through grooves 92 to be pressed by the pressing member 47. The through grooves 92 and the protrusions 95 may be shaped such that the sliding members 94 are slidable only in the radial direction when the protrusions 95 are not pressed by the pressing member 47. The protrusions 95 function as operation portions to be operated to slide the sliding members 94, and additionally function as pressure receiving portions to intensively receive a pressing force from the pressing member 47. As a result, the use of the protrusions 95 facilitates individually adjusting the positions of the sliding members 94 and collectively fixing the sliding members 94.

Preferably, the through grooves 92 extend in the radial direction to a position on an inner side with respect to an outer peripheral edge of the one of the sandwiching members (91, 97). With this configuration, the range of movement of the protrusions 95 of the plurality of sliding members 94 is limited, which can prevent the sliding members 94 from excessively sliding to slip off from the sandwiching members (91, 97).

Preferably, a scale 96 is provided on respective surfaces of the sliding members 94 that face the sandwiching member 91 to indicate an amount of projection from the outer peripheral edge of the sandwiching member 91. The plurality of sliding members 94 can be individually adjusted easily and immediately by setting a value on the scale of the plurality of sliding members to be adjusted to a measured dimension value or a scale value after radial expansion-contraction adjustment, after the dimension of the relevant portion of the tablet to be handled is measured or after radial expansion and contraction of any one of the plurality of sliding members 94 has been adjusted.

The circumferential expansion-contraction mechanism 59 may include a first turning member 70 including one side wall portion 61 of the pairs of side wall portions disposed at predetermined intervals in the circumferential direction, and operable to relatively turn about the axial line within a predetermined angular range, a second turning member 60 including the other side wall portion 71 of the pairs of side wall portions disposed at predetermined intervals in the circumferential direction, and operable to relatively turn about the axial line within the predetermined angular range, and a link mechanism 80 configured to couple the first turning member 70 and the second turning member 60 in an interlocking manner. Preferably, the link mechanism 80 is configured such that, when one of the second turning member 60 and the first turning member 70 is turned toward one side in the circumferential direction by a predetermined angle through a manual operation, the other of the second turning member 60 and the first turning member 70 is turned toward the other side in the circumferential direction by an angle equal to the predetermined angle.

The link mechanism 80 includes a stationary link member 81 provided to be non-rotatable in the circumferential direction with respect to the rotary shaft 41, a first link member 86, one end of which is coupled to the first turning member 70 by a first turning pair (76, 88), a second link member 83, one end of which is coupled to the second turning member 60 by a second turning pair (66, 84), a third turning pair (85, 87) configured to couple the other end of the first link member 86 and the other end of the second link member 83, a first sliding pair (81A, 85) provided between the stationary link member 81 and the third turning pair (85, 87) to allow the third turning pair to slide over a predetermined range in the radial direction of the rotary shaft, a second sliding pair (68, 76) provided between the first turning pair (76, 88) and the second turning member 60, and a third sliding pair (66, 77) provided between the second turning pair (66, 84) and the first turning member 70. Preferably, the stationary link member 81, the first link member 70, the second link member 60, and the first sliding pair (76, 88) to the third sliding pair (66, 77) are configured such that, when one of the first turning member 70 and the second turning member 60 is turned over a predetermined angle in one direction about the axial line of the rotary shaft 41, the other of the first turning member and the second turning member is turned over the predetermined angle in the other direction opposite to the one direction. When the link mechanism is configured in this manner, it is possible to inexpensively implement the link mechanism 80 and the circumferential expansion-contraction mechanism 59 with a small number of components.

In a tablet cassette of a type in which the tablet receiving portions are expanded and contracted in the circumferential direction, unnecessary spaces that are similar to but are not the tablet receiving portions are formed in the outer peripheral surface of the rotor between adjacent tablet receiving portions. Therefore, overhanging portions that overhang from the cap member are provided over the unnecessary spaces, in order to prevent the tablets from undesirably falling into the unnecessary spaces. However, the presence of the overhanging portions tends to extend the time for the tablets having come onto the overhanging portions to fall into the tablet receiving portions, which may incur a reduction in the efficiency of processing the tablets. It is conceivable to provide a tossing mechanism in which the rotor intermittently slightly tosses the tablets remaining on the overhanging portions along with rotation of the rotor, as illustrated in FIGS. 1, 4(*a*), and 4(*c*) of Patent Document 3. With measures in which a tossing mechanism is used, members that constitute the tossing mechanism are added to not only the tablet container but also the rotor, complicating the structure of the rotor. Moreover, modifying the rotor requires a relatively large burden, and is not easily achieved by just additionally processing the rotor, unlike the tablet container. Thus, it is desired to implement a tablet cassette capable of resolving stagnation of the tablets in the tablet container even without modifying the rotor.

Thus, in another aspect of the present invention, a lid portion 29 of the tablet container 20 is provided with a suspended member 104 suspended from the lid portion to contact the tablets on the rotor 40 to move the tablets. By providing such a suspended member 104, the suspended member 104 can act on the tablets on the rotor 40 to cause the tablets to fall down without providing a tossing mechanism.

A tablet moving mechanism 100 may be constituted from the suspended member 104, a support structure 101 provided on a lower surface of the lid portion 29 to swingably support the suspended member 104, and a weight portion 107 provided at a free end portion of the suspended member 104. When such a structure is adopted, it is enough to mount the tablet moving mechanism only to the lid portion 29 of the tablet container, and it is not necessary to mount the tablet moving mechanism to the body portion of the tablet container or the rotor mounted therein. Moreover, the tablet moving mechanism may be mounted to the tablet cassette at times other than during manufacture of a new cassette. An aspect in which the support structure 101 is attached to the existing lid portion through additional processing etc. can be conveniently implemented by just replacing the existing lid portion with a lid portion to which the tablet moving mechanism has been mounted.

When the weight portion 107 suspended from the support structure on the lower surface of the lid portion via the suspended member 104 abuts against the tablets that have been moved along with rotation of the rotor 40, the weight portion 107 is pushed by the tablets to be swung together with the suspended member 104. In addition, the weight portion 107 is swung through deformation of the suspended member 104. As a result, the weight portion 107 interferes with the tablets directly and gently, and thus rocks the tablets in the cassette by naturally acting on the tablets intensively at a necessary location. Thus, it is possible to implement a tablet cassette capable of resolving stagnation of the tablets in the cassette even without modifying the rotor.

The cap member 50 is shaped to stir tablets in the tablet containing space 22; and in the case where the cap member 50 is provided with a plurality of overhanging portions 52 extending in the radial direction except for areas above the plurality of tablet receiving portions 67, the support structure 101 is structured such that the suspended member 104 is suspended to a position (preferably immediately above the overhanging portions 52) at which the suspended member 104 contacts the tablets remaining on the overhanging portions 52 to cause the tablets to fall into the tablet receiving portions 67. With this configuration, the tablets residing on the overhanging portions are efficiently guided to the tablet receiving portions through interference with the weight portion.

The suspended member 104 may be structured to be elastically deformed according to displacement of the weight portion 107. For example, the suspended member 104 may include a flexible tubular member 106 and an elongated elastic member 105 housed in a cavity of the tubular member 106. With this configuration, a suspended member with both suitable deformability and a suitable restoring force can be conveniently implemented.

The elastic member 106 may be a coil spring, and the weight portion 107 may be coupled to the coil spring but not be coupled to the tubular member 106. With this configuration, when the weight portion 107 is subjected to an external force applied in a direction different from the swinging direction, e.g. an external force applied to expand the suspended member 104 in the longitudinal direction, the coil spring is expanded to mitigate a shock due to abrupt application of the external force and enhance the free mobility of the weight portion to allow the weight portion to smoothly escape. As a result, a shock is mitigated even when the weight portion directly hits the tablets.

A retaining portion 108 on which at least one of the suspended member 104 and the weight portion 107 is retained may be provided on the lower surface of the lid portion 29. In this case, the support structure 101 is configured such that the suspended member 104 which has been released from the retaining portion 108 is gradually brought into a suspended state as the tablets in the tablet containing space 22 are decreased. By providing the retaining portion to allow the suspended member or the weight portion to be mounted to and removed from the retaining portion, it is possible to retain the suspended member or the weight portion on the retaining portion when the tablet moving mechanism is not used, and to disengage the suspended member or the weight portion from the retaining portion to be suspended when the tablet moving mechanism is used.

Thus, preferably, the weight portion 107 is suspended over a movement path of the plurality of tablet receiving portions 67 when the suspended member 104 is suspended by only a weight of the weight portion 107. With this configuration, the weight portion 107 is suspended over (preferably directly over) the movement path of the tablet receiving portions 67 when the amount of tablets contained has become small during use of the tablet moving mechanism. Then, the tablets staying on portions of the rotor 40 that define the tablet receiving portions 67 etc. collide against the weight portion 107 to be moved mainly in a direction along the movement path of the tablet receiving portions 67, and thus to be efficiently guided to the tablet receiving portions 67.

DESCRIPTION OF EMBODIMENTS

Tablet cassettes according to embodiments of the present invention will be described in detail below with reference to the drawings.

First Embodiment

Figure 1:
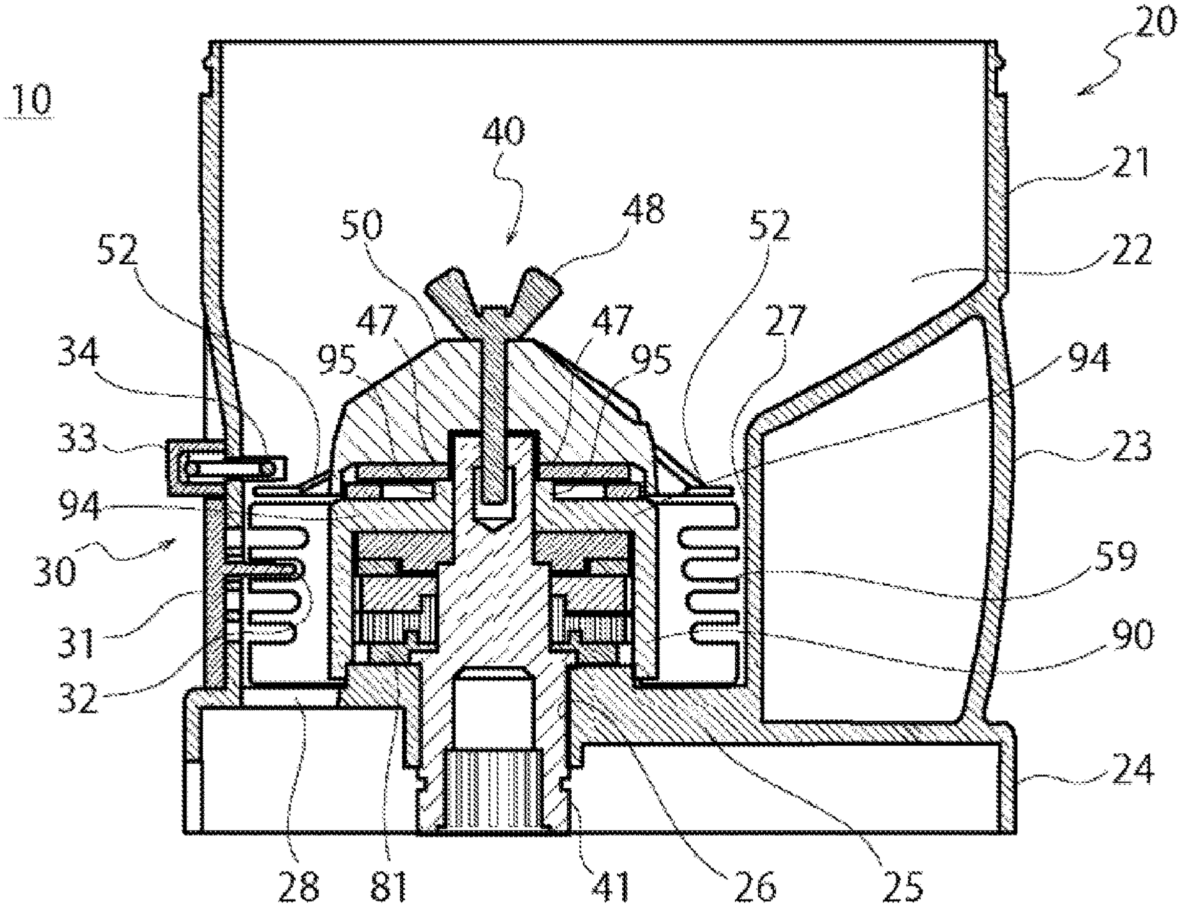
FIG. 1 is a vertical sectional view of a tablet cassette with a lid portion being removed.

FIG. 1 is a vertical sectional view of a tablet cassette 10 with a lid portion being removed.

Figure 2:
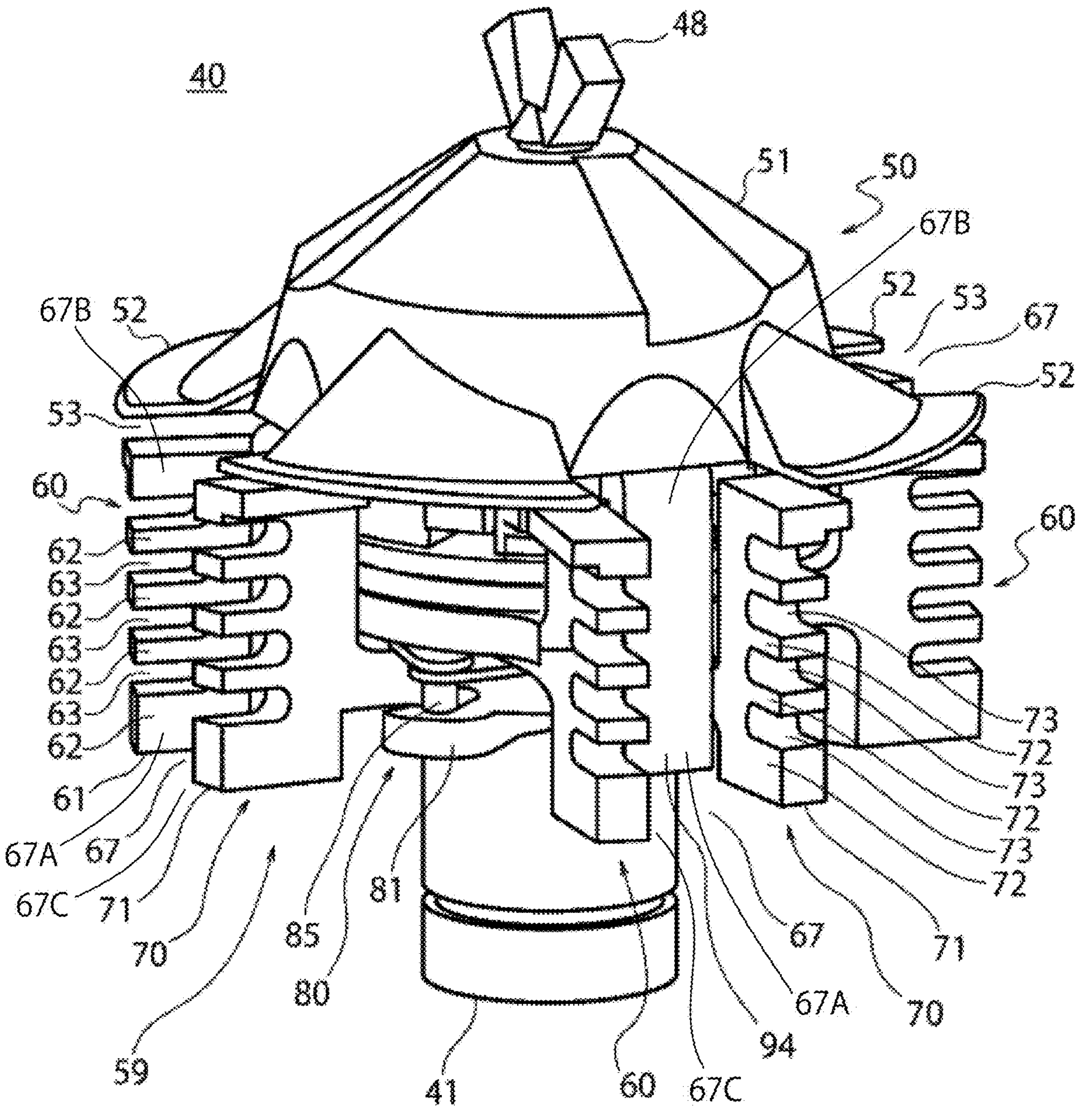
FIG. 2 is a perspective view illustrating the appearance of a rotor.
Figure 3:
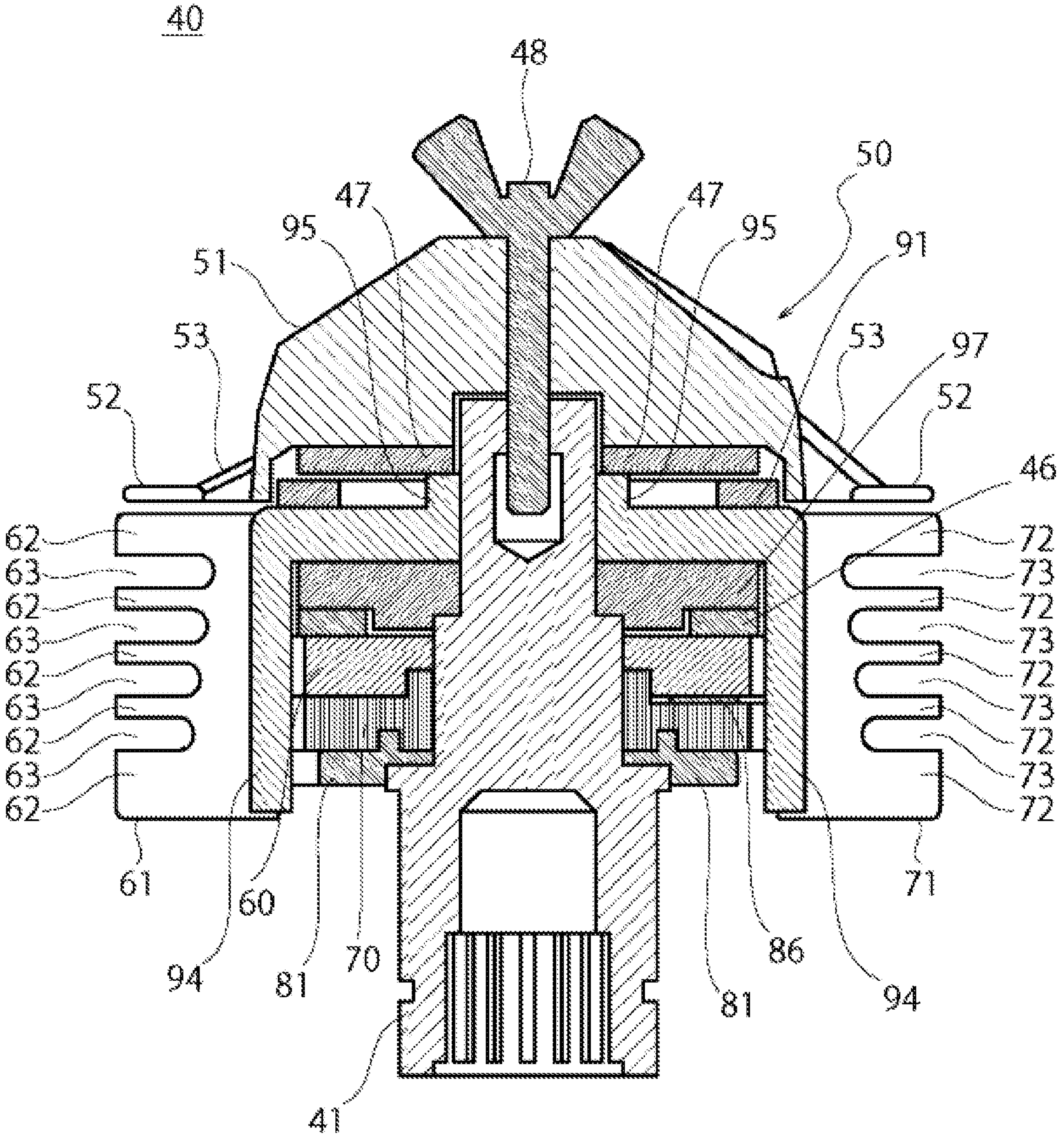
FIG. 3 is an enlarged vertical sectional view of the rotor.
Figure 4:
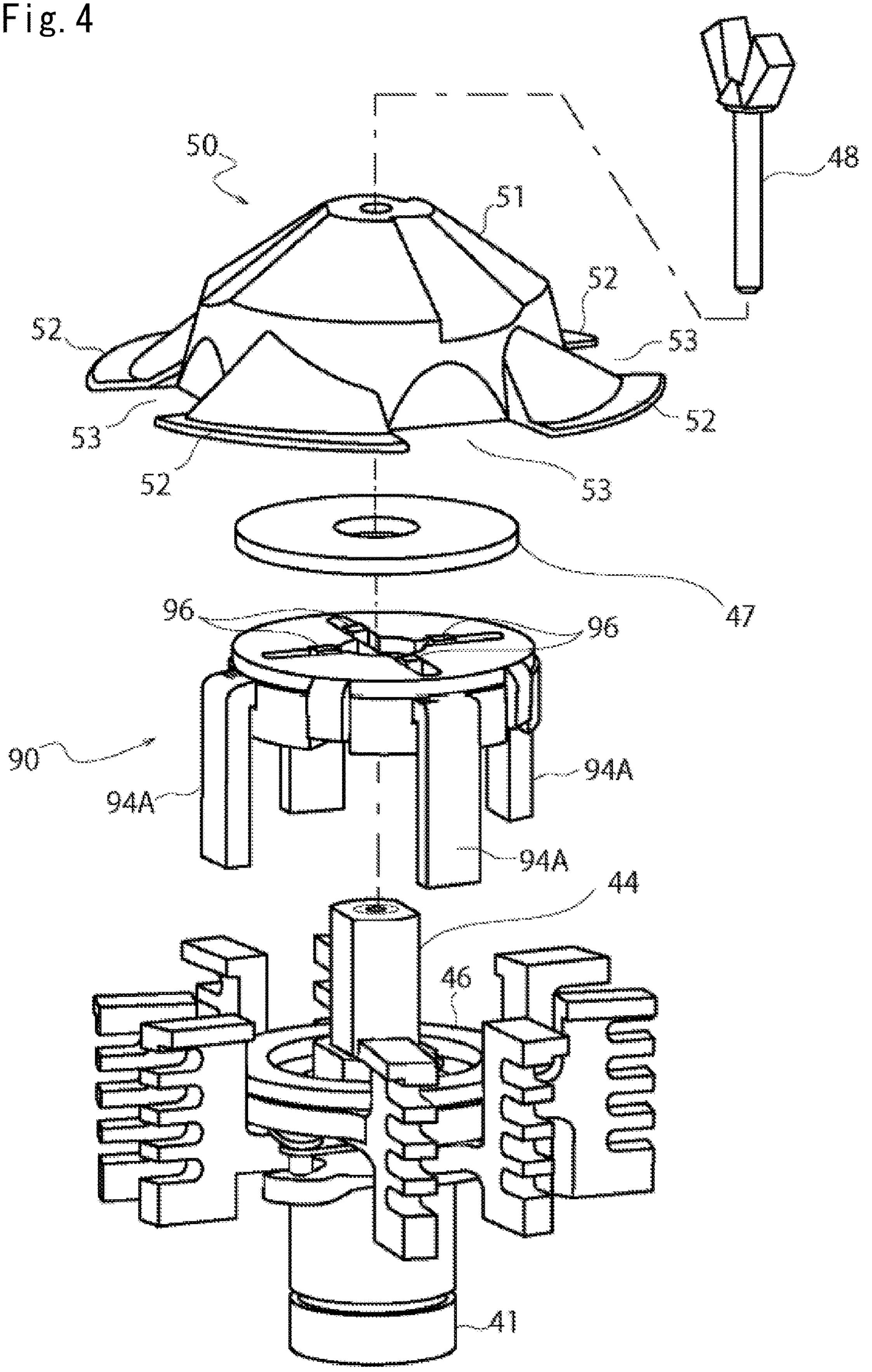
FIG. 4 is an exploded perspective view of the rotor during assembling.

FIG. 2 is a perspective view illustrating the appearance of a rotor 40. FIG. 3 is an enlarged vertical sectional view of the rotor 40. FIG. 4 is an exploded perspective view of the rotor 40 during assembly. Some units in FIG. 4 are not exploded.

Figure 5:
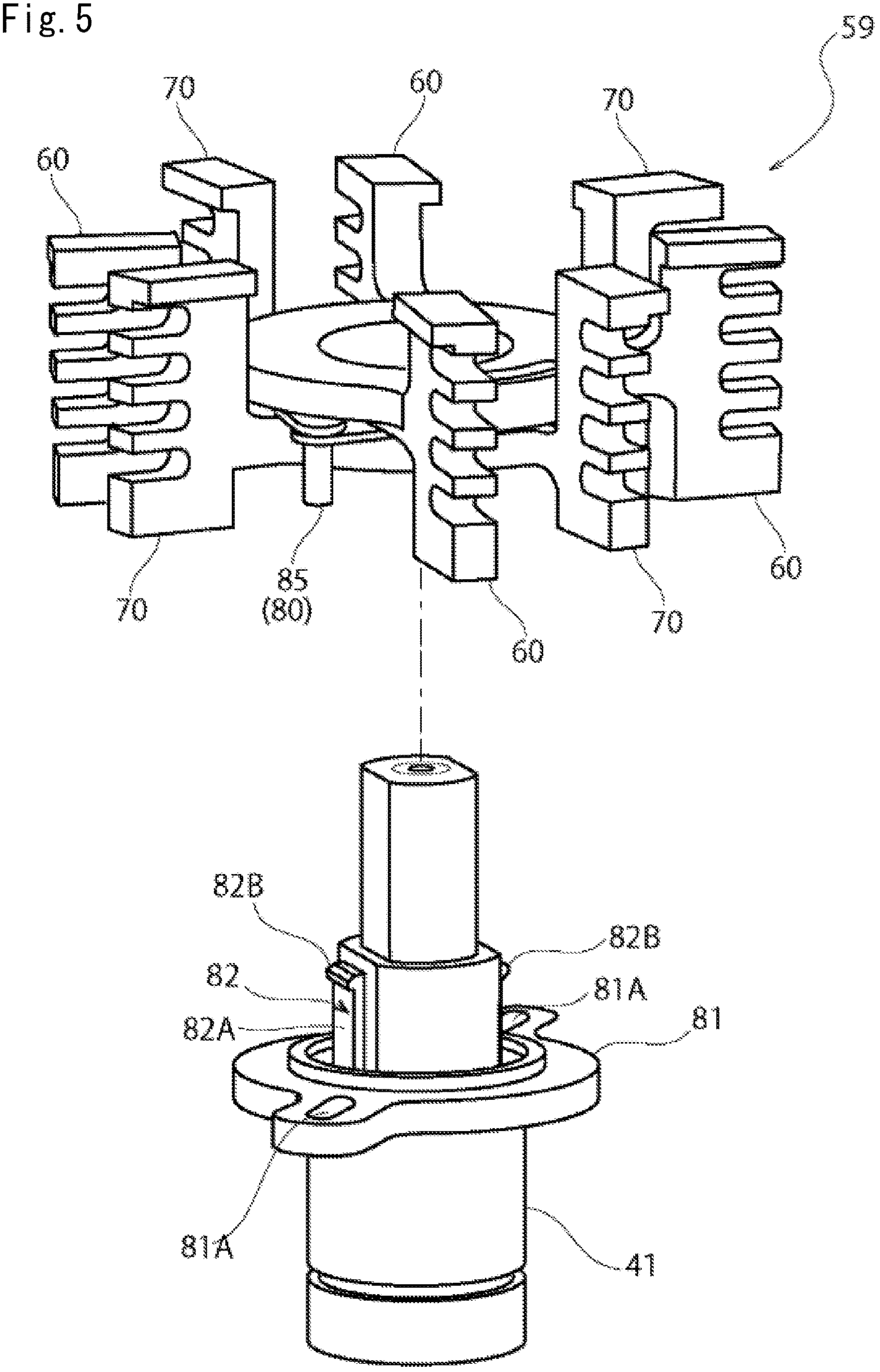
FIG. 5 is a developed perspective view of a rotary shaft and a circumferential expansion-contraction mechanism.
Figure 6:
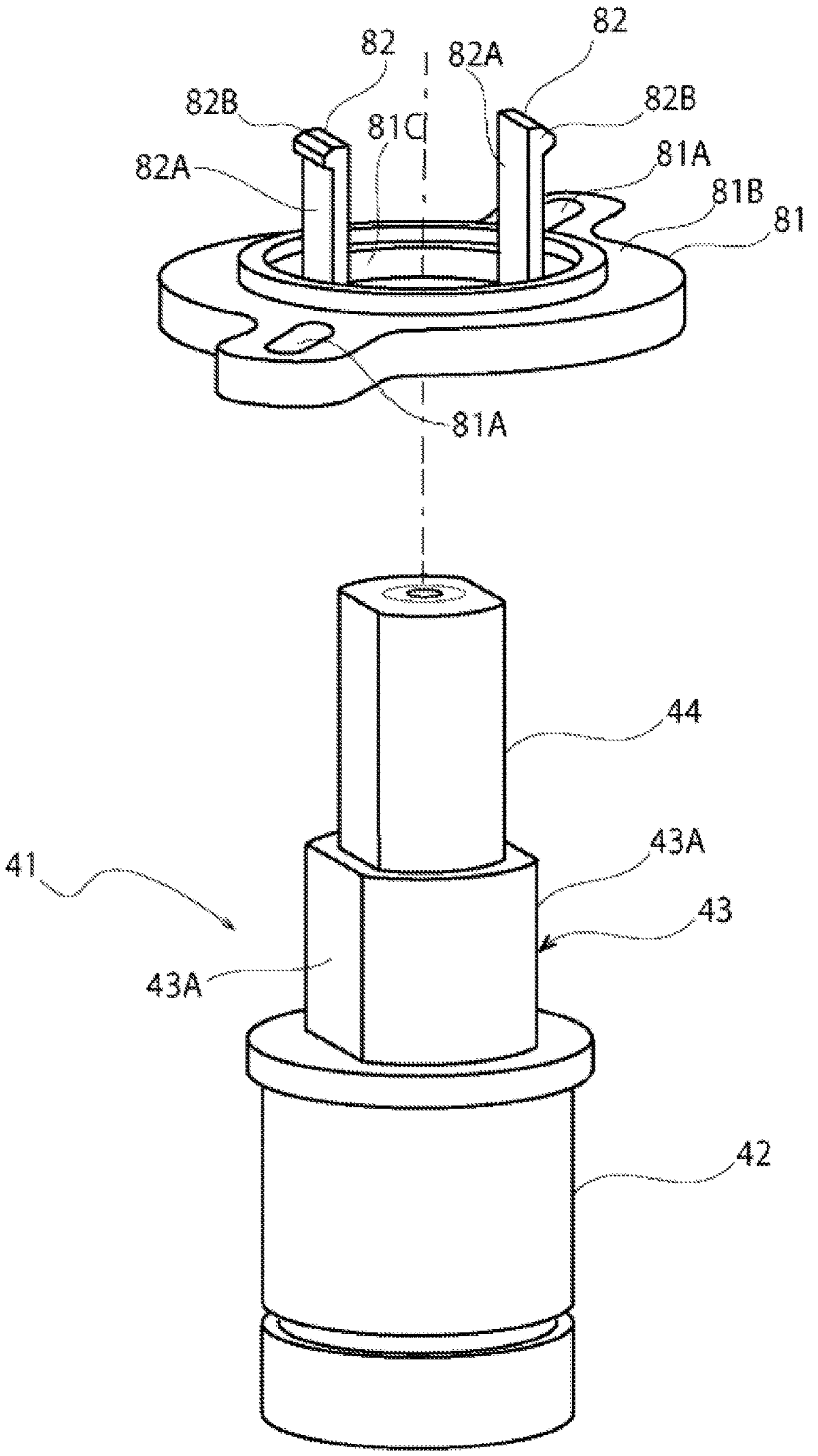
FIG. 6 is a developed perspective view in which the rotary shaft and a stationary link member of a link mechanism are separated from each other.
Figure 7:
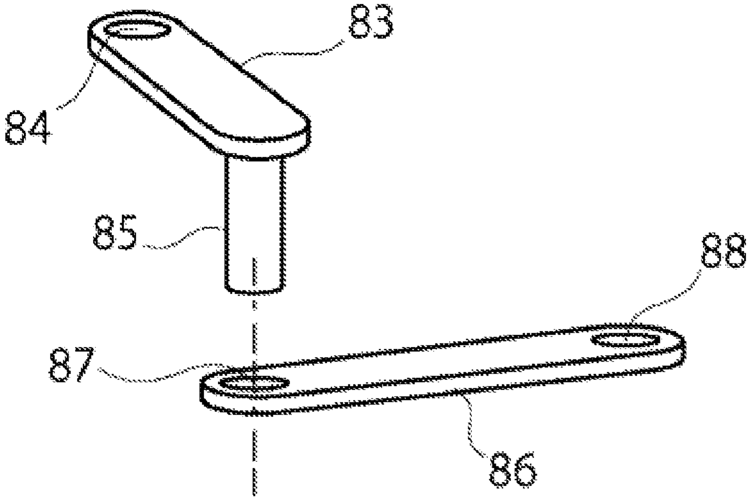
FIG. 7 is a developed perspective view of a first link member and a second link member of the link mechanism.
Figure 8:
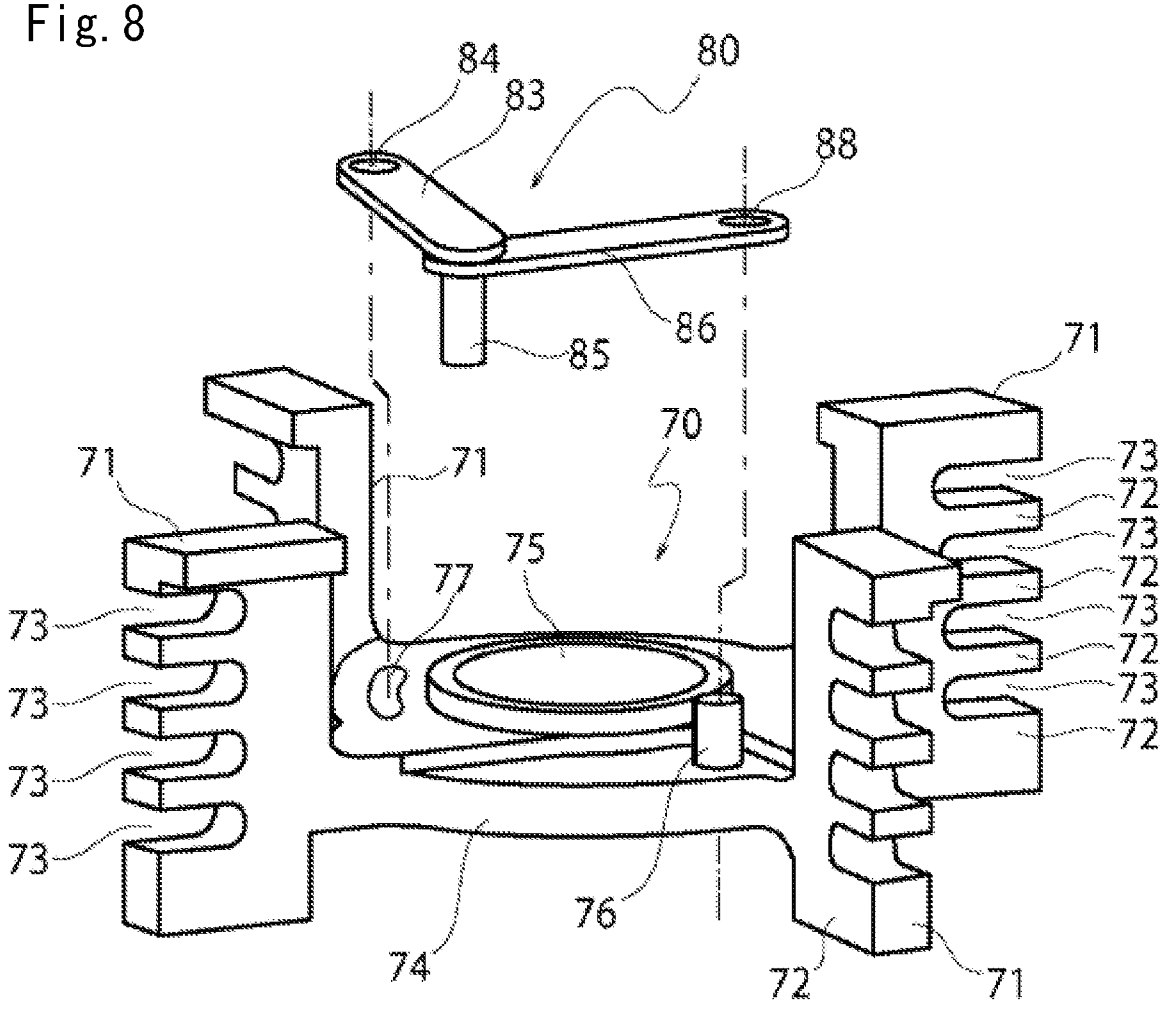
FIG. 8 is a developed perspective view of a first turning member of the circumferential expansion-contraction mechanism and the link members of the link mechanism.
Figure 9:
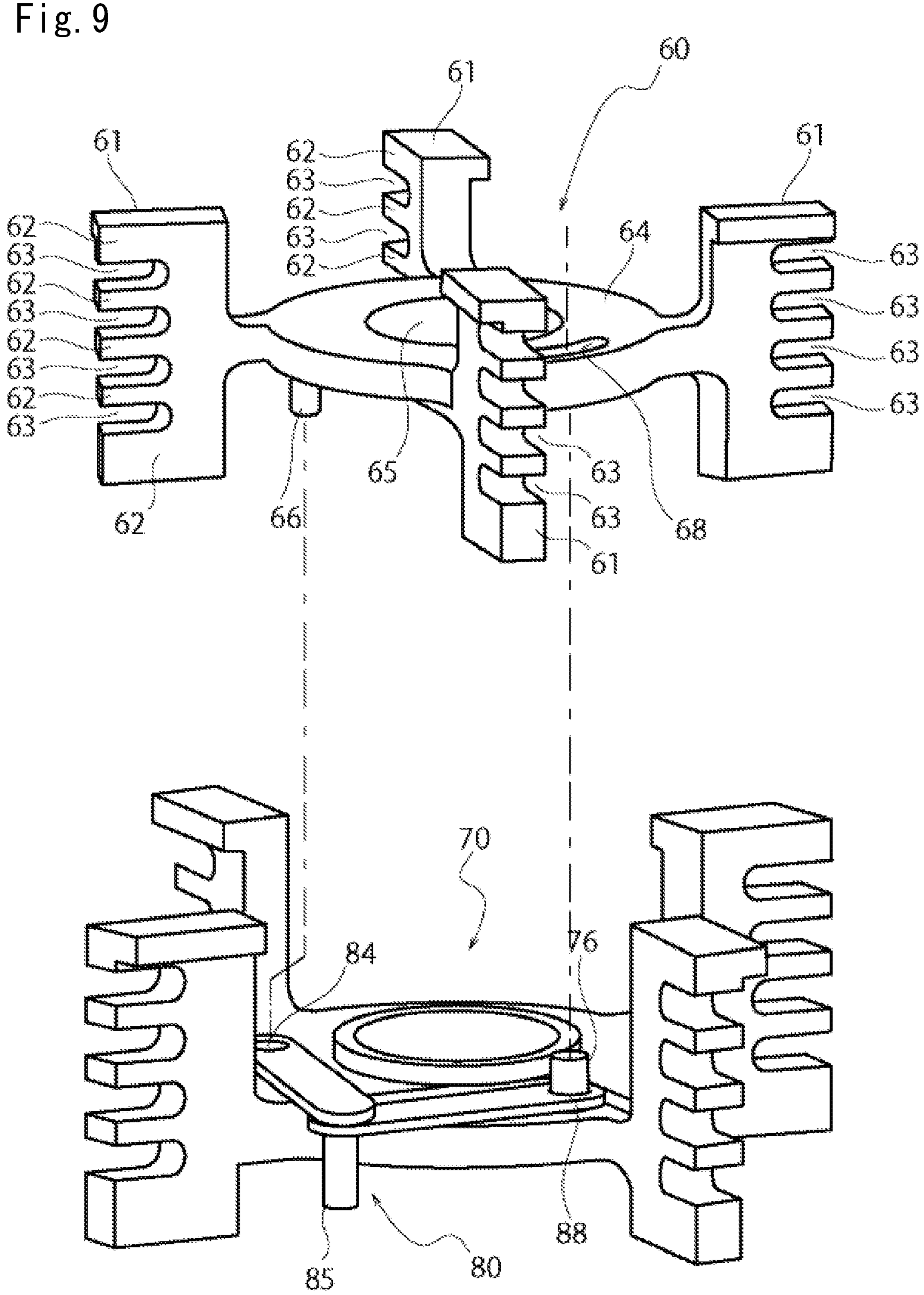
FIG. 9 is a developed perspective view of the link members, the first turning member, and a second turning member of the circumferential expansion-contraction mechanism.
Figure 10:
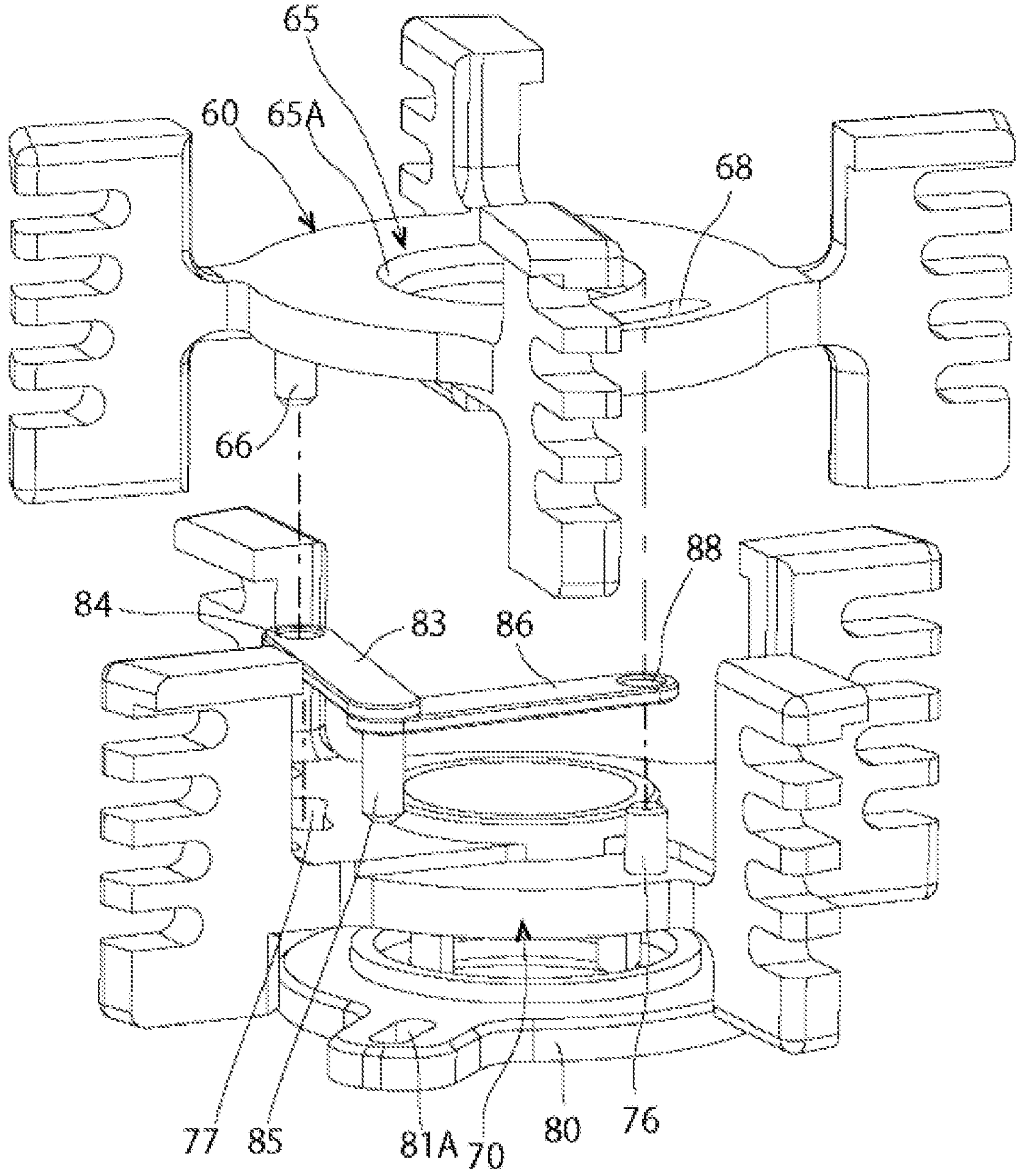
FIG. 10 is a developed perspective view of the circumferential expansion-contraction mechanism including the stationary link member.
Figure 11:
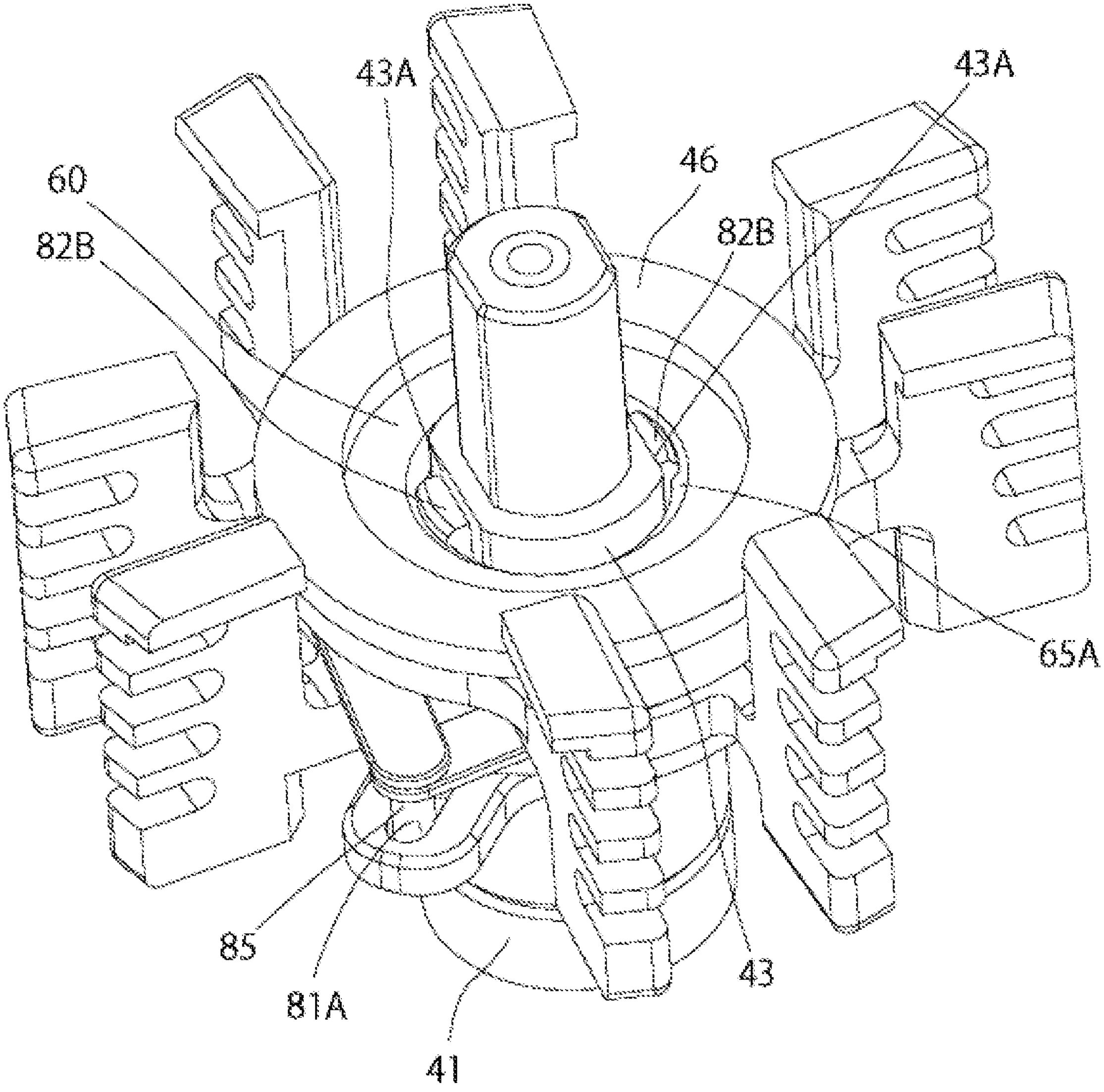
FIG. 11 is a developed perspective view of the circumferential expansion-contraction mechanism and a spacer.
Figure 12:
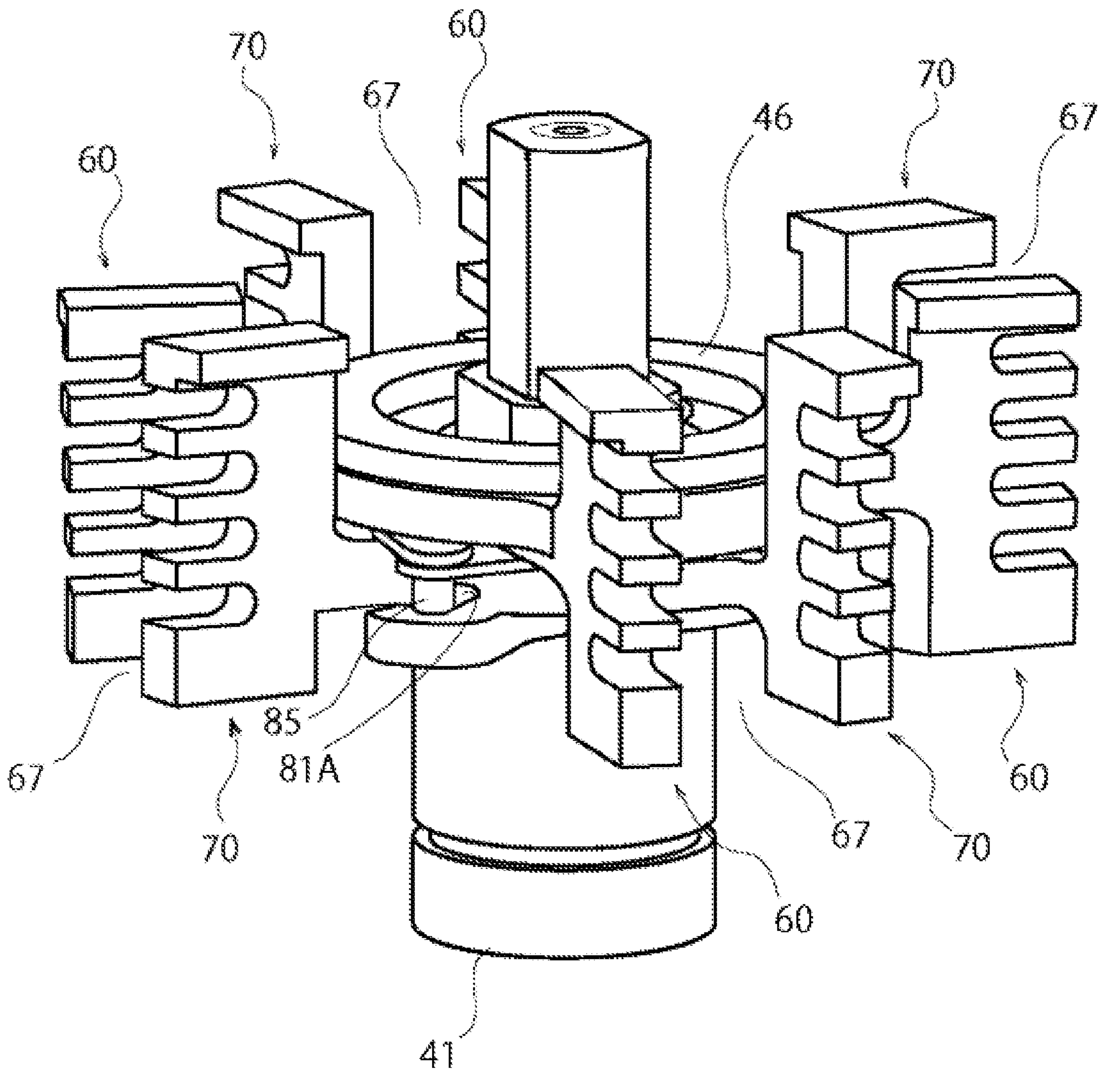
FIG. 12 is an enlarged perspective view illustrating the appearance of an assembly of the circumferential expansion-contraction mechanism with the rotary shaft and the spacer.
Figure 13:
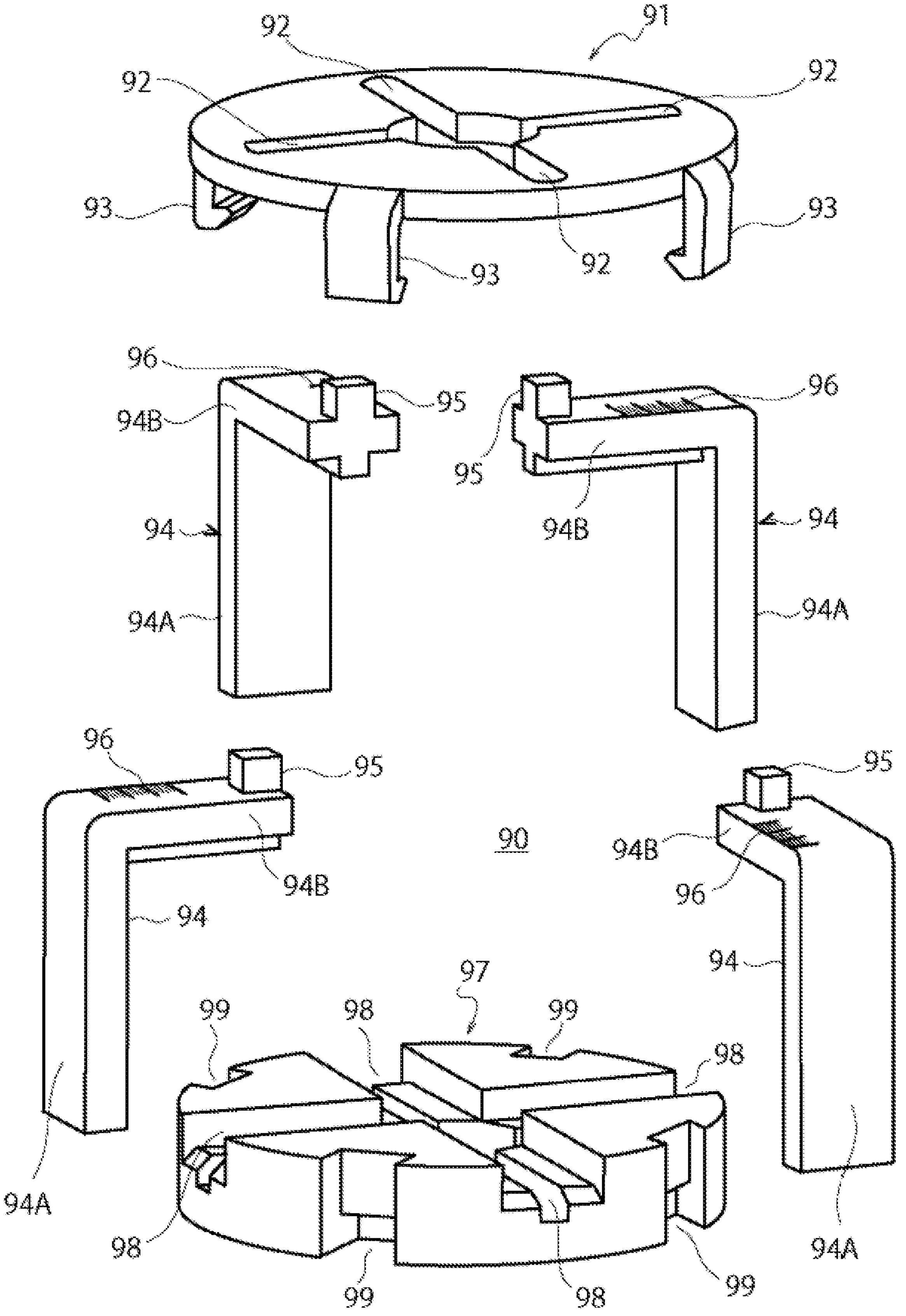
FIG. 13 is a developed perspective view of a radial expansion-contraction mechanism.
Figure 14:
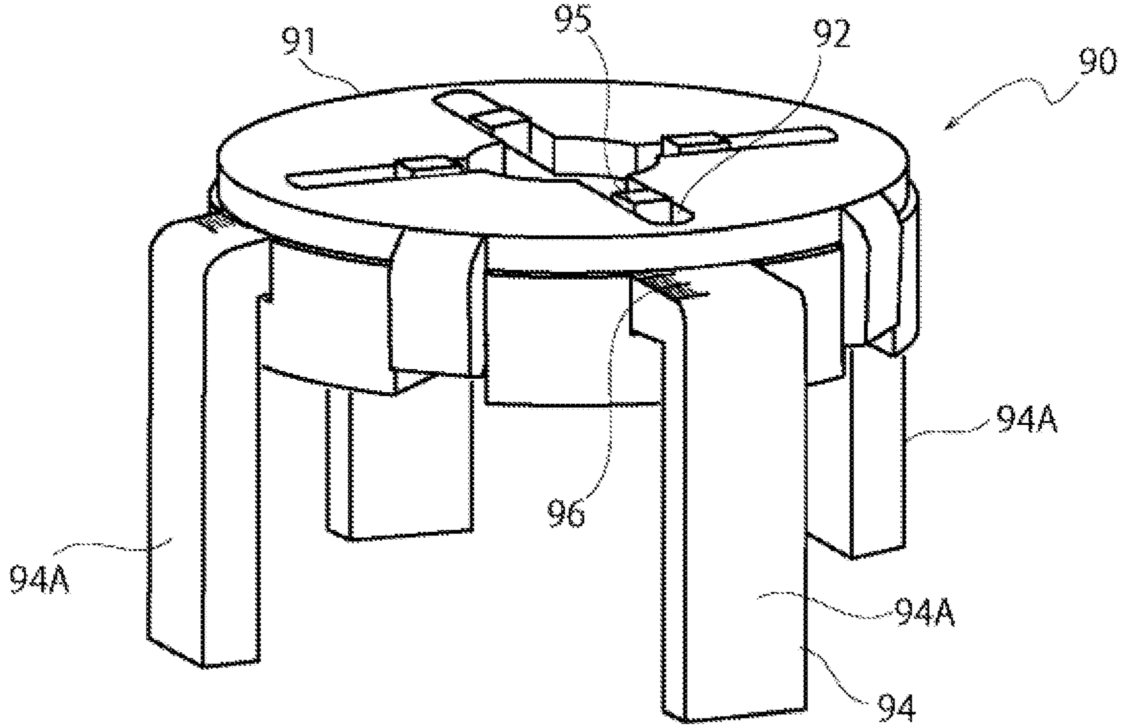
FIG. 14 is a perspective view illustrating the appearance of the radial expansion-contraction mechanism in an unadjusted state in which four sliding members of the radial expansion-contraction mechanism are not aligned in radial position.
Figure 15:
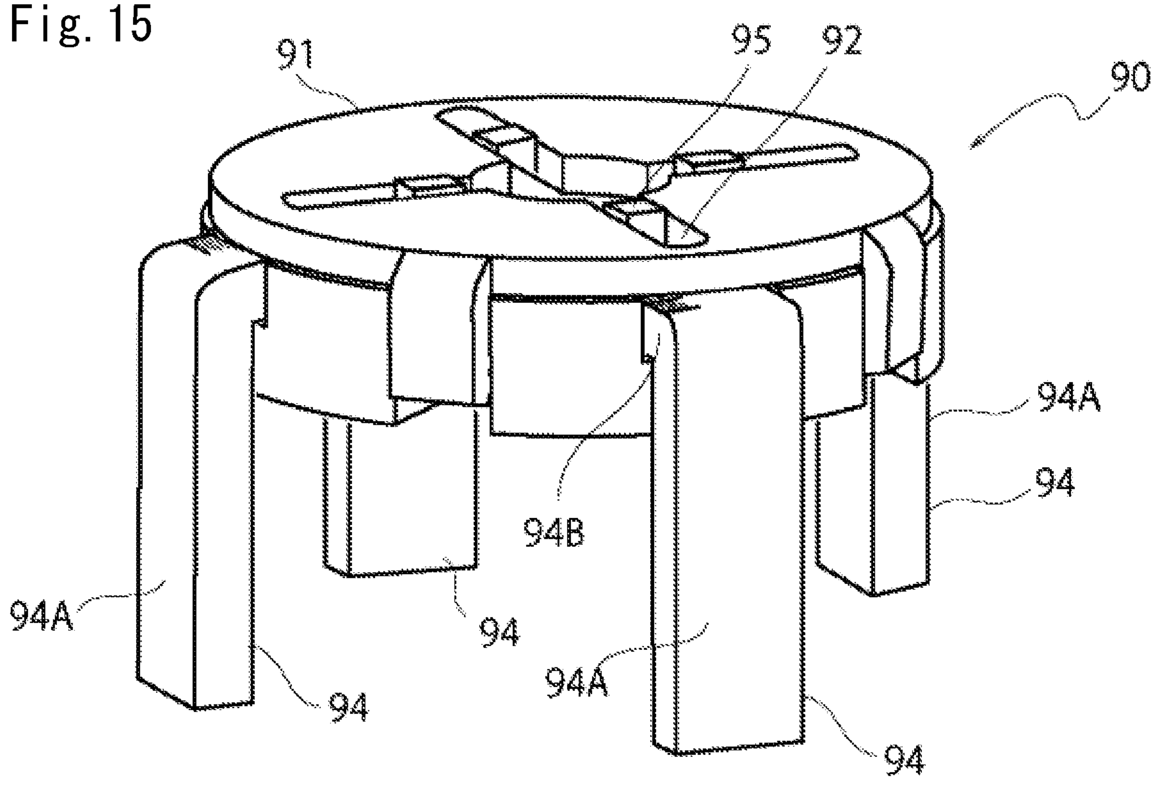
FIG. 15 is a perspective view illustrating the appearance of the radial expansion-contraction mechanism in an adjusted state in which the four sliding members are aligned in radial position.

FIG. 5 is a developed perspective view of a rotation transmission shaft, that is, a rotary shaft 41, and a circumferential expansion-contraction mechanism 59. FIG. 6 is a developed perspective view in which the rotary shaft 41 and a stationary link member 81 of a link mechanism 80 are separated from each other. FIG. 7 is a developed perspective view of a first link member 86 and a second link member 83 of the link mechanism 80. FIG. 8 is a developed perspective view of a first turning member 70 of the circumferential expansion-contraction mechanism 59 and the link members 83, 86 of the link mechanism 80. FIG. 9 is a developed perspective view of the link members 83, 86, the first turning member 70, and a second turning member 60 of the circumferential expansion-contraction mechanism 59. FIG. 10 is a developed perspective view of the circumferential expansion-contraction mechanism 59 including the stationary link member 81. FIG. 11 is a developed perspective view of the circumferential expansion-contraction mechanism 59 with the rotary shaft 41 and a spacer 46. FIGS. 10 and 11 are each a two-dimensional representation of a 3D CAD drawing, unlike the other drawings. FIG. 12 is an enlarged perspective view illustrating the appearance of an assembly of the circumferential expansion-contraction mechanism 59 with the rotary shaft 41 and the spacer 46. FIG. 13 is a developed perspective view of a radial expansion-contraction mechanism 90. FIG. 14 is a perspective view illustrating the appearance of the radial expansion-contraction mechanism 90 in an unadjusted state in which four sliding members 94 of the radial expansion-contraction mechanism 90 are not aligned in radial position. FIG. 15 is a perspective view illustrating the appearance of the radial expansion-contraction mechanism 90 in an adjusted state in which the four sliding members 94 are aligned in radial position.

As illustrated in FIG. 1, the tablet cassette 10 includes a tablet container 20 obtained by partially modifying the tablet container according to the related art (see Patent Documents 1 to 3, for example), and a rotor 40 modified in configuration to add a function to expand and contract tablet receiving portions 67 while maintaining compatibility for integration into the tablet container 20. The tablet container 20 mainly includes a box-shaped container body 21 manufactured through injection molding etc. of plastic. The internal space of the container body 21 serves as a tablet containing space 22 for containing a large number of tablets in a random manner. The tablet containing space 22 may be opened and closed by a lid portion (not illustrated) to be replenished with tablets etc. A grip 23 for carriage is provided on the outer side of the container body 21. The lower portion of the container body 21 serves as a mount-unmount portion 24 for a drive portion (base) (not illustrated).

The tablet container 20 includes a discharge port 28 formed to penetrate one location (left side in FIG. 1) of a bottom wall portion 25 of the container body 21. When a tablet is carried to a location above the discharge port 28 through rotation of the rotor 40, the tablet falls downward through the discharge port 28. When a partition holding portion 31 configured to allow a partition unit 30 to be removably mounted to the container body 21 of the tablet container 20 is mounted to the container body 21 from the outer side so that a partitioning portion 32 is inserted into the tablet containing space 22 through a slit in the container body 21, the partitioning portion 32 is positioned above the discharge port 28. In this state, tablets located below the partitioning portion 32 fall down through the discharge port 28, but tablets above the partitioning portion 32 are hindered from falling down. This structure allows the tablets to successively fall down.

The tablet container 20 is configured such that a belt holding portion 33 can be mounted or removably mounted to the container body 21 from the outside. The belt holding portion 33 holds an elastic endless belt 34, which is made of rubber in a round string shape, for example, in a tense state. When the partition unit 30 is mounted to the container body 21 and the endless belt 34 is inserted into the tablet containing space 22 through the slit in the container body 21, the endless belt 34 is positioned above the discharge port 28 and the partitioning portion 32.

The rotor 40 (see FIGS. 1 to 3) is housed in the tablet container 20 in the state of being rotatable about the axial line of the rotary shaft 41, as with the rotor according to the related art (see Patent Documents 1 to 3, for example). The rotor 40 defines a plurality of tablet receiving portions 67 (four tablet receiving portions 67 in the present example) on the bottom wall portion 25 of the tablet containing space 22. The rotor 40 transfers the tablets, which have fallen into the tablet receiving portions 67, to the discharge port 28 together with the tablet receiving portions 67 as the rotor 40 is rotated. In order to allow the plurality of tablet receiving portions 67 to be readily expanded and contracted, the rotor 40 includes a circumferential expansion-contraction mechanism 59 operable to increase and reduce the width dimension of the tablet receiving portions 67, a radial expansion-contraction mechanism 90 operable to increase and reduce the radial dimension of the tablet receiving portions 67, a pressing member 47, and a cap member 50 provided at a head portion of the rotor, all of which are not provided in the related art. The components 59, 90, 47, 50 are externally mounted on the rotary shaft 41 as a leg portion of the rotor (also see FIG. 4) to be axially rotated along with axial rotation of the rotary shaft 41.

The rotary shaft 41 (see FIGS. 1 and 6) is inserted into a through hole 26 in the bottom wall portion 25 of the tablet container 20, and rotatably penetrates the bottom wall portion 25. A lower end portion 42 of the rotary shaft 41 is configured to project downward from the bottom wall portion 25 to be fitted and meshed with a rotary drive shaft of a drive portion (not illustrated). The rotary shaft 41 is configured such that an intermediate portion 43 is smaller in diameter than the lower end portion 42, an upper end portion 44 is smaller in diameter than the intermediate portion 43, and the intermediate portion 43 and the upper end portion 44 constitute an insertion portion to be positioned in the tablet containing space 22 inside the container body 21. The circumferential expansion-contraction mechanism 59, the pressing member 47, the radial expansion-contraction mechanism 90, and the cap member 50 are externally mounted on the insertion portion of the rotary shaft 41, sequentially in this order from the lower side. When the cap member 50 is screwed to the distal end of the rotary shaft 41 by a setscrew 48, the cap member 50 exerts a pressing force to the lower members to fix such members to the rotary shaft 41 (see FIGS. 1 to 4). By mounting the rotor 40 to the rotary shaft 41 in this manner, four tablet receiving portions 67 are defined between an inner peripheral surface 27 of the container body 21 and the rotor 40 (see FIG. 3) in the present example.

The rotor 40 is mounted to and removed from the tablet container 20 in an integrated state in which the rotor 40 is totally assembled (see FIGS. 1 to 3). The rotor 40 that is used in the present embodiment may be developed into units (groups) to be easily handled, before the rotor 40 is integrated or when the rotor 4 is removed from the tablet container 20 to adjust expansion and contraction of the tablet receiving portions 67. Specifically, the rotor 40 is divided into units such as the rotary shaft 41 and the circumferential expansion-contraction mechanism 59, the radial expansion-contraction mechanism 90 provided thereabove, the pressing member 47, the cap member 50, and the setscrew 48. The radial expansion-contraction mechanism, the pressing member 47, the cap member 50, and the setscrew 48 are mounted in this order to the circumferential expansion-contraction mechanism 59 and the rotary shaft 41 from above the upper end portion 44. Next, when the distal end of the setscrew 48 is screwed into the upper end of the rotary shaft 41, the members are securely coupled and integrated. When the setscrew 48 is rotated in the opposite direction, the members are loosened to allow the rotor 40 to be removed from the rotary shaft 41. In the present embodiment, the pressing member 47, the setscrew 48, and the cap member 50 constitute a constraining mechanism (47, 48, 50) configured to disable a plurality of sliding members 94, to be discussed later, to slide with respect to a slide allowing holding member (91, 97).

The circumferential expansion-contraction mechanism 59 (see FIGS. 1 to 4) is constituted from a second turning member 60 provided on the upper side, a first turning member 70, and a link mechanism 80 provided therebetween in the present embodiment, in order to enable the four tablet receiving portions 67 to expand and contract in the circumferential direction in conjunction with each other. The second turning member 60, the first turning member 70, and the link mechanism 80 therebetween are integrated and unitized (grouped) when all such members are mounted to the rotary shaft 41 (see the lowermost portion of FIG. 4 and FIG. 12). To be discussed in detail, the stationary link member 81 of the link mechanism 80 is first mounted (see the lower half of FIG. 5) to the intermediate portion 43 of the rotary shaft 41 (see FIG. 6).

Next, the circumferential expansion-contraction mechanism 59 with the remaining members 83 to 88 of the link mechanism 80 being attached thereto is mounted to the rotary shaft 41 (see the lower half of FIG. 11). In that event, the first turning member 70, the link members 86, 85 of the link mechanism 80, and the second turning member 60 may be mounted to the rotary shaft 41, either one by one in this order (see FIGS. 7 to 10) or after these members are assembled (see FIG. 5). Further, a spacer 46 is mounted from above to the rotary shaft 41 with the circumferential expansion-contraction mechanism 59 being attached thereto (see FIG. 11). Thus, the circumferential expansion-contraction mechanism 59 is assembled with the rotary shaft 41 and the spacer 46 being attached thereto (see FIG. 12).

In contrast, the radial expansion-contraction mechanism 90 (see FIG. 13) is configured to be integrated and unitized by sandwiching sliding portions 94B of the four sliding members 94 between a pair of sandwiching members, namely, an upper sandwiching member 91 and a lower sandwiching member 97 respectively located at the upper and lower sides and then engaging portions 93 of the upper sandwiching member 91 and engaged portions 99 of the lower sandwiching member 97 with each other (see FIG. 13). The radial expansion-contraction mechanism 90 can be integrated and unitized (grouped) without being mounted to the rotary shaft 41, and handled as an integrated object (see FIGS. 4, 14, and 15).

[Circumferential Expansion-Contraction Mechanism]

The second turning member 60 (see the upper half of FIG. 9) of the circumferential expansion-contraction mechanism 59 includes a base portion 64 shaped in a circular plate and having a through hole 65 formed at the center thereof to allow insertion of the intermediate portion 43 of the rotary shaft 41 therethrough, four side wall portions 61 configured to radially project in the radial direction at equal angles from the base portion 64, and a pin 66 provided to project from the lower surface of the base portion 64. One surface 62 of each of the side wall portions 61 forms one of circumferential facing surfaces of each of the tablet receiving portions 67. A plurality of grooves 63 (four are illustrated in the drawing) are formed at the outer end portion of the side wall portions 61, in order to avoid interference with the partitioning portion 32. An arcuate through hole 68 is formed to penetrate the base portion 64 of the second turning member 60, in order to avoid interference with a pin 76 of the first turning member 70 as discussed in detail next (also see the lower half of FIG. 9).

The first turning member 70 (see FIG. 8) includes a base portion 74 in a circular plate shape in which a through hole 75 that allows insertion of the intermediate portion 43 of the rotary shaft 41 therethrough is formed at the center, four side wall portions 71 configured to radially project in the radial direction at equal angles from the base portion 74, and a pin 76 provided to project from the upper surface of the base portion 74. One surface 72 of each of the side wall portions 71 forms the other of the circumferential facing surfaces of each of the tablet receiving portions 67. A plurality of grooves 73 (four are illustrated in the drawing, the same number as that of the corresponding grooves 63 discussed above) are also formed at the outer end portion of the side wall portions 71, in order to avoid interference with the partitioning portion 32. An arcuate through hole 77 is also formed to penetrate the base portion 74 of the first turning member 70, in order to avoid interference with the pin 66 of the second turning member 60 (also see the lower half of FIG. 8 and FIG. 10). Both the second turning member 60 and the first turning member 70 are loosely engaged with the rotary shaft 41 with the through holes 65, 75 being slightly larger than the intermediate portion 43 of the rotary shaft 41, and thus are rotatable about the rotary shaft 41 inserted therein.

The link mechanism 80 (see FIGS. 2 and 5 to 10) is configured such that, when one of the second turning member 60 and the first turning member 70 is turned toward one side in the circumferential direction by a predetermined angle through a manual operation, the other of the second turning member 60 and the first turning member 70 is turned toward the other side in the circumferential direction by an angle equal to the predetermined angle. The link mechanism 80 includes a first link member 86 (lower link member) and a second link member 83 (upper link member). At one end portion of the second link member 83, a circular through hole 84 is formed and at the other end portion of the second link member 83, a coupling pin 85 is formed to project. At one end portion of the first link member 86, a circular through hole 87 is formed and at the other end of the first link member 86, a circular through hole 88 is formed to penetrate (see FIGS. 7 and 8).

As illustrated in FIG. 6, the stationary link member 81 has a pair of elongated through holes 81A, 81A formed at positions facing each other in the radial direction of an annular body to extend in the radial direction. The stationary link member 81 includes a pair of hook members 82, 82 provided at the inner peripheral portion of a through hole 81C formed at the center of an annular body 81B to face each other in the radial direction of the annular body 81B and extend along the axial line of the rotary shaft 41. The pair of hook members 82, 82 each integrally include a hook body 82A, and a hook member 82B. The side sectional surface of the hook body 82A is in a rectangular shape to contact a pair of flat surface portions 43A, 43A provided on the intermediate portion 43 of the rotary shaft 41 to face each other in the radial direction.

As illustrated in FIG. 11, the stationary link member 81 is non-rotatable in the circumferential direction with respect to the rotary shaft 41 with the hook bodies 82A of the pair of hook members 82, 82 contacting the flat surface portions 43A, 43A of the intermediate portion 43 of the rotary shaft. The hook portions 82B, 82B of the pair of hook members 82, 82 are engaged with a tapered surface 65A formed at the inner edge portion of the through hole 65 formed in the second turning member 60. This prevents the second turning member 60 from slipping off. The second turning member 60 and the first turning member 70 are rotatable about the rotary shaft 41 when the setscrew 48 illustrated in FIGS. 1 to 4 is loosened.

One end of the first link member 86 is coupled to the first turning member 70 by a first turning pair (pin 76 and through hole 88). One end of the second link member 83 is coupled to the second turning member 60 by a second turning pair (pin 66 and through hole 84 in FIGS. 9 and 10). The other end of the first link member 86 and the other end of the second link member 83 are coupled to each other by a third turning pair (85 and through hole 87). A first sliding pair (elongated through hole 81A and pin 85) is formed between the stationary link member 81 and the third turning pair (pin 85 and through hole 87) to allow the third turning pair (pin 85 and through hole 87) to slide over a predetermined range in the radial direction of the rotary shaft 41. A second sliding pair (arcuate through hole 68 and pin 76) is formed between the first turning pair (pin 76 and through hole 88) and the second turning member 60. A third sliding pair (pin 66 and arcuate elongated through hole 77) is formed between the second turning pair (pin 66 provided on second turning member 60 and through hole 84 in FIGS. 9 and 10) and the first turning member 70.

The stationary link member 81, the first link member 86, the second link member 83, and the first sliding pair (elongated through hole 81A and pin 85) to the third sliding pair (pin 66 and arcuate elongated through hole 77) are configured such that, when one of the first turning member 70 and the second turning member 60 is turned by a predetermined angle in one direction about the axial line of the rotary shaft 41, the other of the first turning member 70 and the second turning member 60 is turned by the predetermined angle in the other direction opposite to the one direction. When the link mechanism 80 is configured in this manner, it is possible to inexpensively implement the link mechanism 80 and the circumferential expansion-contraction mechanism 59 with a small number of components.

In the link mechanism 80, the elongated through hole 81A formed in the stationary link member 81 and extending in the radial direction regulates motion of the pin 85 of the first sliding pair to the radial direction, and the arcuate through hole 77 formed in the first turning member 70 and the arcuate through hole 68 formed in the second turning member 60 regulate motion of the pin 76 of the second sliding pair and the pin 66 of the third sliding pair to the circumferential direction. As a result, when one of the first turning member 70 and the second turning member 60 is moved in the circumferential direction, the other can be moved in the opposite circumferential direction in an interlocking manner. Consequently, the circumferential dimensions of the plurality of tablet receiving portions 67 can be adjusted in an interlocking manner without changing the center positions of the tablet receiving portions 67.

[Radial Expansion-Contraction Mechanism]

As illustrated in FIGS. 4 and 13 to 15, the radial expansion-contraction mechanism 90 individually expands and contracts the plurality of tablet receiving portions 67 in the radial direction through a manual operation. The radial expansion-contraction mechanism 90 is externally mounted on the rotary shaft 41, and includes a plurality of sliding members 94 respectively provided for the plurality of tablet receiving portions 67, and a slide allowing holding member (91, 97). The plurality of sliding members 94 each include the facing wall portion 94A at one end thereof and are slidable in the radial direction of the rotary shaft 41 to individually move the facing wall portion 94A in the radial direction. The slide allowing holding member (91, 97) is configured to hold the plurality of sliding members 94 to be slidable in the radial direction. In the present embodiment, a constraining mechanism (47, 48, 50) is provided to be configured to disable the plurality of sliding members 94 to slide with respect to the slide allowing holding member (91, 97) with the circumferential expansion-contraction mechanism 59 and the radial expansion-contraction mechanism 90 externally mounted on the rotary shaft 41. Radial expansion and contraction of the plurality of tablet receiving portions 67 is individually adjusted by sliding the plurality of sliding members 94. Thus, such adjustment can be readily made even with a small force. The constraining mechanism (47, 48, 50) is provided to be configured to disable the plurality of sliding members 94 to slide with respect to the slide allowing holding member (91, 94) after individual adjustment is all finished. The constraining mechanism can easily prevent a change in the state of adjustment.

The constraining mechanism (47, 48, 50) includes the pressing member 47 to be pressed against the plurality of sliding members 94 to hinder sliding of the plurality of sliding members 94. The state of expansion and contraction of the tablet receiving portions is fixed by simply pressing the pressing member 47 against the radial expansion-contraction mechanism. Therefore, the plurality of sliding members 94 can be collectively fixed, even if the plurality of sliding members 94 are individually adjusted.

The radial expansion-contraction mechanism 90 is disposed on the circumferential expansion-contraction mechanism 59 such that the plurality of facing wall portions 94A are inserted into the plurality of tablet receiving portions 67. The constraining mechanism (47, 48, 50) further includes a cap member 50 mounted to the rotary shaft to press the pressing member 47 disposed on the radial expansion-contraction mechanism 90 toward the plurality of sliding members 94. With this configuration, the pressing member 47 can be pressed against the plurality of sliding members 94 by mounting the cap member 50, and thus the constraining mechanism can be easily mounted through the rotor assembly work.

The slide allowing holding member (91, 97) includes the upper sandwiching member 91 and the lower sandwiching member 97 (a pair of sandwiching members) that hold the plurality of sliding members 94 by sandwiching the sliding portions 94B of the sliding members 94 at both sides in the axial direction. In the present embodiment, the upper sandwiching member 91 and the lower sandwiching member 97 are unitized by engaging the engaging portions 93 of the upper sandwiching member 91 and the engaged portions 99 of the lower sandwiching member 97 with each other (see FIG. 13). The upper sandwiching member 91, which is one of the upper sandwiching member 91 and the lower sandwiching member 97 positioned on the pressing member 47 side, has a plurality of through grooves 92 formed to expose a part (protrusion 95) of the plurality of sliding members 94 to be able to contact the pressing member 47. Linear guide paths 98 are formed in the upper surface of the lower sandwiching member 97 (see FIG. 13) to extend straight from the center to the outer edge. When the upper sandwiching member 91 and the lower sandwiching member 97 are vertically stacked on each other, each pair of the through groove 92 and the guide path 98 arranged vertically extend in the radial direction in parallel with each other.

The sliding members 94 (see FIG. 13) each include the facing wall portion 94A that is vertically elongated to face the tablet receiving portion 67, the sliding portion 94B bent at the upper end portion of the facing wall portion 94A to extend horizontally, and the protrusion 95 that protrudes upward from the distal end of the sliding portion 94B. That is, the protrusion 95 is provided at the other end of each of the plurality of sliding members 94, and is configured to be located in a corresponding one of the through grooves 92 to be pressed by the pressing member 47. The through groove 92 and the protrusion 95 are shaped such that the sliding member 94 is slid in only the radial direction when the protrusion 95 is not pressed by the pressing member 47. The protrusions 95 function as operation portions to be operated to slide the sliding members 94, and additionally function as pressure receiving portions to intensively receive a pressing force from the pressing member 47. The pressing member 47 plays the role of naturally pressing the protrusions 95 by abutting against the protrusions 95 of the plurality of sliding members 94 which are inevitably subjected to a certain degree of manufacturing error. Therefore, the pressing member 47 is preferably formed from a material with better deformation performance and cushioning performance than those of the cap member 50. Specifically, the pressing member 47 is formed from an elastic material such as silicon rubber. The pressing member 47 is not formed from the same material as the material of the cap member 50 since it is not integrated with the cap member 50.

The radial expansion-contraction mechanism 90 is completed by placing the sliding portions 94B of the sliding members 94 in the guide paths 98 of the lower sandwiching member 97 with the facing wall portions 94A of the sliding members 94 projecting from the outer edge of the lower sandwiching member 97, and then placing the upper sandwiching member 91 on top of the lower sandwiching member 97 to engage the members 91 and 97 with each other (see FIGS. 14 and 15).

In the thus configured radial expansion-contraction mechanism 90, the sliding portions of the sliding members 94 are sandwiched from the upper and lower sides by the upper sandwiching member 91 and the lower sandwiching member 97 to be held in the guide paths 98, and the protrusions 95 of the sliding members 94 are inserted into the through grooves 92 from below to slightly project upward. Therefore, the sliding members 94 can be individually drawn outward in the radial direction (see FIG. 14) and pushed inward in the radial direction (see FIG. 15). Moreover, movement of the protrusions 95 in the radially outward direction is blocked at the outer end of the through grooves 92 by the protrusions 95 and the outer edge portion of the upper sandwiching member 91 abutting against each other. Thus, an undesired occurrence of the sliding members 94 slipping off from the slide allowing holding member (91, 97) is not caused.

In this manner, the radial expansion-contraction mechanism 90 allows the tablet receiving portions 67 to be individually expanded and contracted in the radial direction by individually moving the sliding members 94 into and out of the slide allowing holding member (91, 97) using a finger etc. A scale 96 is provided on respective surfaces of the sliding members 94 that face the upper sandwiching member 91 to indicate an amount of projection from the outer peripheral edge of the upper sandwiching member 91. The plurality of sliding members 94 can be individually adjusted easily and immediately by setting a value on the scale of the plurality of sliding members to be adjusted to a measured dimension value or a scale value after radial expansion-contraction adjustment, after the dimension of the relevant portion of the tablet to be handled is measured or after radial expansion and contraction of any one of the plurality of sliding members 94 has been adjusted. The plurality of sliding members 94 can be aligned in radial position easily and adequately by comparing the scale 96 and the outer peripheral surface of the upper sandwiching member 91 (see FIG. 14).

When the pressing member 47 and the cap member 50 are placed on the radial expansion-contraction mechanism 90 fitted at the upper end portion 44 of the rotary shaft 41 and fastened using the setscrew 48 as illustrated in FIG. 4, the pressing member 47 is pressed against the radial expansion-contraction mechanism 90 to press the protrusions 95 (see FIG. 3), which adequately hinders radial movement of the sliding members 94.

In the present embodiment, the radial expansion-contraction mechanism 90 which includes the plurality of sliding members 94 can be handled as a single unit, even when the radial expansion-contraction mechanism 90 is separated from the rotary shaft and the circumferential expansion-contraction mechanism 59. As a result, radial expansion and contraction can be easily individually adjusted by sliding the plurality of sliding members 94.

Operation According to First Embodiment

The use and operation of the tablet cassette 10 will be described below with reference to the drawings etc. discussed above.

It is necessary to adapt the size of the tablet receiving portions 67 of the tablet cassette 10 to the size of tablets prior to the use of the tablets. The size of the tablet receiving portions 67 is manually adjusted. The adjustment is basically performed on the rotor 40 in the state of being removed from the tablet container 20 (see FIGS. 3 and 4). The radial expansion-contraction mechanism 90 and the circumferential expansion-contraction mechanism 59 are separated from each other when the setscrew 48 is rotated and extracted (see FIG. 4). An adjustment is made on each of the radial expansion-contraction mechanism 90 and the circumferential expansion-contraction mechanism 59. In that event, the adjustment may be made by causing the tablet receiving portions 67 to follow a tablet with the tablet contained in any of the tablet receiving portions 67, or may be made by measuring the size etc. of a tablet and varying the circumferential width and the radial dimension of the tablet receiving portions 67 on the basis of the measured value. In the case of the tablet cassette 10, the former method is suitably used to adjust the circumferential expansion-contraction mechanism 59, and the latter method is suitably used to adjust the radial expansion-contraction mechanism 90.

To adjust the circumferential width of the tablet receiving portions 67 using the circumferential expansion-contraction mechanism 59 (see FIGS. 11 and 12), a side wall portion 61 and a side wall portion 71 that face each other across one of the four tablet receiving portions 67 are separated from each other; a tablet is put into the tablet receiving portion 67; the side wall portion 61 and the side wall portion 71 are moved closer to each other until the tablet is sandwiched; and then the clearance between the side wall portion 61 and the side wall portion 71 is slightly widened. When the circumferential width of the tablet receiving portion 67 to be operated is increased and reduced to a width that is necessary for successive passage of the tablets, the circumferential width of all the four tablet receiving portions 67 is adjusted to a width that is necessary for successive passage of the tablets at the same time in an interlocking manner. Therefore, adjustment of the circumferential expansion-contraction can be made collectively and adequately, even if there are a plurality or a large number of tablet receiving portions 67, and thus can be finished conveniently and immediately.

To adjust the radial, width of the tablet receiving portions 67 using the radial expansion-contraction mechanism 90 (see FIGS. 14 and 15), the thickness and the radial width of a tablet are first measured using a ruler etc. Then, each of the four sliding members 94 is drawn out (see FIG. 14) and pushed in (see FIG. 15) so that a scale line on the scale 96 that indicates a value corresponding to the measured width comes directly under the radially outer end of the upper sandwiching member 91. This adjustment can be performed conveniently and immediately by referencing the scale 96, and thus the burden of adjustment is not increased even if the adjustment is repeatedly performed a number of times corresponding to the number of the sliding members 94.

Next, the radial expansion-contraction mechanism 90, the pressing member 47, and the cap member 50 (see FIG. 4) that have been separated from the rotary shaft 41 are returned to the rotary shaft 41 with which the circumferential expansion-contraction mechanism 59 has been fitted, and then the setscrew 48 is tightened (see FIG. 3), thereby finishing the adjustment for the rotor 40. When the rotor 40 is mounted back to the tablet container 20, the tablet cassette 10 can be used to contain desired tablets in a random manner and successively discharge the tablets. The tablet cassette 10 is replenished with an appropriate amount of tablets. One of tablet cassettes that is mounted to a tablet dispensing apparatus etc. and that can be dispensed with for the moment is selected and removed from a drive portion, and the tablet cassette 10 is attached to the drive portion.

In the case where the tablets are of a small type among tablets that can be handled by the tablet cassette 10, the side wall portions 61, 71 approach the sliding members 94 with the facing clearance between the side wall portions 61, 71 being reduced, and appear under slits 53 of the cap member 50 (see FIGS. 3 and 4). The sliding members 94 also approach the inner peripheral surface 27 of the container body 21 to reduce the facing clearance (see FIG. 1), and appear under the slits 53 of the cap member 50. A large portion of the facing wall portion 94A of the sliding members 94 that appear under the slits 53 is a smooth curved surface, and thus tablets having fallen onto the curved surface from a center portion 51 etc. of the cap member 50 quickly fall into the tablet receiving portions 67 without staying on the curved surface.

In the case where the width of the tablets is slightly larger, the side wall portions 61, 71 are accordingly moved away through adjustment, and thus the side wall portions 61, 71 are slightly moved away from the sliding members 94, and partially hidden under overhanging portions 52 of the cap member 50. However, the side wall portions 61, 71 are moved in opposite directions over the same distance, and thus the circumferential position of the tablet receiving portions 67 is maintained at the center position with respect to the slits 53 between the overhanging portions 52 of the cap member 50, and the circumferential position of the sliding members 94 in the tablet receiving portions 67 is also maintained at the center position. As a result, an undesired occurrence of the tablets falling into a gap between the side wall portions 61, 71 and the sliding member 94 is avoided, even if such a gap is widened, and the tablets fall into the tablet receiving portions 67.

In the case where the width of the tablets is still larger, the side wall portions 61, 71 are accordingly significantly moved away through adjustment, and thus the side wall portions 61, 71 are mostly or entirely hidden under the overhanging portions 52 of the cap member 50. In this case, the circumferential width of the upper end portion of the tablet receiving portions 67 is regulated to the upper limit or less of an appropriate range by the slits 53 of the cap member 50, both the positional relationship between the circumferential centers of the tablet receiving portions 67 and the slits 53 and the positional relationship between the circumferential centers of the tablet receiving portions 67 and the sliding members 94 are maintained, and thus the tablets fall into the tablet receiving portions 67.

In the case where the tablets are slightly larger also in the thickness direction, further, the sliding members 94 are retracted toward the rotary shaft 41 through adjustment made according to the thickness of the tablets. The sliding members 94 are moved away from the inner peripheral surface 27 of the container body 21, and a part of a bent portion of the sliding members 94 is hidden under the center portion 51 of the cap member 50. In the case where the thickness of the tablets is much larger, most of the sliding members 94 is hidden under the center portion 51 of the cap member 50 through adjustment made according to the thickness. In any case, the tablets fall into only the tablet receiving portions 67.

In the cap member 50 of the tablet cassette 10 (see FIG. 4), the circumferential width of the overhanging portions 52 is larger than the circumferential width of the slits 53. Therefore, the tablets tend to stay on the overhanging portions 52 compared to the tablet cassette with the conventional structure. However, the endless belt 34 is provided above the overhanging portions 52 (see FIG. 1), and thus the tablets placed and carried on the overhanging portions 52 abut against the endless belt 34 to receive a reaction force from the endless belt 34 before being moved over the entire circumference. As a result, the tablets are blocked at the endless belt 34 to change their posture or be pushed up to the center portion 51 of the cap member 50. Then, if the next tablet receiving portion 67 to come is empty, the tablets on the cap member 50 fall into the tablet receiving portion 67.

If the next tablet receiving portion 67 is not empty, the tablets stay above the partitioning portion 32, even if the tablets fall halfway into the tablet receiving portion 67, and pass above the discharge port 28, and thereafter fall to the bottom of the tablet receiving portion 67 that has been emptied. Therefore, the tablets are successively discharged adequately without a significant delay.

In the present embodiment, the link member is not used for the radial expansion-contraction mechanism 90. In the circumferential expansion-contraction mechanism 59, the link mechanism 80 is constituted from three link members, namely the second link member 83, the first link member 86, and the stationary link member 81 (see FIG. 7), which reduces the number of components. Therefore, looseness, backlash, etc. are not likely to be caused between the link members, and only a small space is required for the link members to move (see FIGS. 2 and 3). In addition, an undesired occurrence of an event such as entry and accumulation of powder generated from the tablets in between the link members is also suppressed.

In the present embodiment, the members that constitute the rotor 40 are disposed with little gap therebetween (see FIG. 2, for example) when not only the link members but also the other members are assembled, and thus a similar effect is exhibited. The positional relationship among the members that constitute the rotor 40 is fixed by simply tightening the setscrew 48. Therefore, the toughness and the durability of the rotor 40 are improved.

[Others]

In the embodiment described above, a row of lines are indicated as the scale 96 on the upper surface of the sliding portions 94B of the sliding members 94 (see FIGS. 13 to 15). However, the present invention is not limited thereto. For example, other auxiliary indications such as numerical values for guidance may also be indicated. The scale 96 may be indicated on a side surface of the sliding members 94, or may be indicated on both the upper surface and a side surface thereof. The lines as the scale 96 may be formed to be recessed by engraving. In that manner, the sliding members 94 can be advanced and retracted with the tip of a nail being caught in the recess of a scale line during adjustment, which allows the sliding members 94 to be aligned easily and adequately.

In the embodiment described above, four tablet receiving portions 67 are provided. However, the number of the tablet receiving portions 67 is not limited to four, and may be more or less than four. In the embodiment described above, the pressing member 47 is provided as a single independent object. However, the pressing member 47 may be provided as bonded etc. to the lower surface of the cap member 50.

In the embodiment described above, the partitioning portion 32 is described as a thin plate-like body. However, the partitioning portion 32 is not limited to a plate-like body, and an elastic endless belt similar to the endless belt 34 can be adopted as the partitioning portion 32, although the partition holding portion 31 is complicated. That allows upper and lower tablets to be adequately partitioned, even if size adjustment of the tablet receiving portions 67 is more or less rough, thereby facilitating size adjustment of the tablet receiving portions 67. The condition for forming the grooves 63, 73 for avoiding interference between the partitioning portion 32 and the side wall portions 61, 71 is also relaxed.

Second Embodiment

In a second embodiment illustrated in FIGS. 16 to 18, a tablet moving mechanism 100 has been added to the first embodiment described with reference to FIGS. 1 to 15. Thus, in the following description, members that are common to the members illustrated in FIGS. 1 to 15 are given the same numerals as the numerals given in FIGS. 1 to 15 to omit description.

Figure 18:
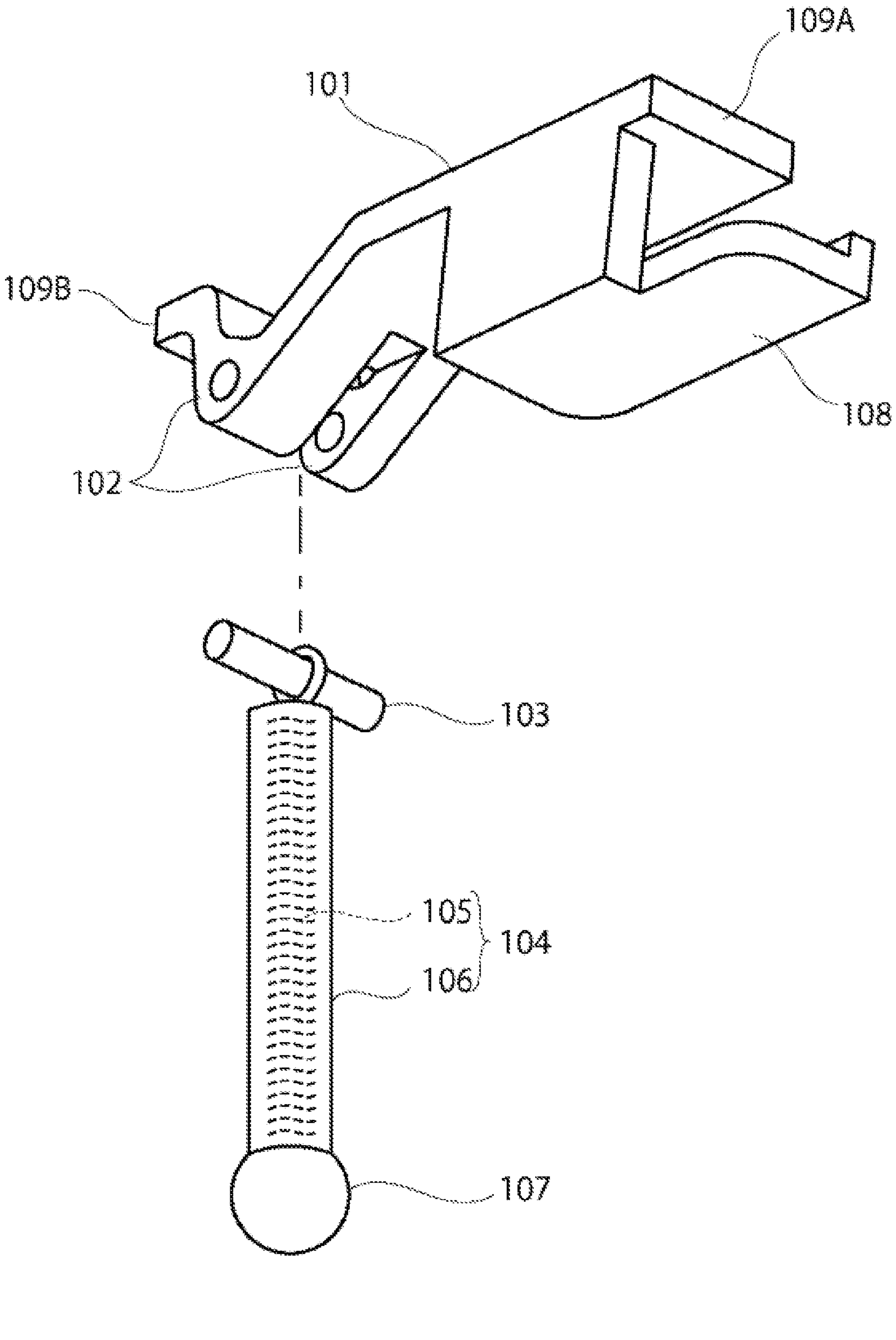
FIG. 18 is a developed perspective view of the tablet moving mechanism.

As illustrated in FIG. 18, the tablet moving mechanism 100 includes a support structure 101 attached and fixed to the lower surface of a lid portion 29 of the tablet container 20, and a suspended member 104 and a weight portion 107 attached to the support structure 101 through a support shaft 103 to be suspended and swingable during use. The support structure 101 is generally elongated horizontally, and has end portions 109A, 109B for retention at both ends in the longitudinal direction. A shaft support portion 102 configured to hold the support shaft 103 to be axially rotatable is integrally formed near one end portion 109B of the support structure 101. A retaining portion 108 for placing the suspended member 104 thereon is integrally formed near the other end portion 109A of the support structure 101.

The suspended member 104 has a straight bar structure obtained by combining an elastic member 105 formed from a coil spring with a suitable resilient force and a tubular member 106 formed from a flexible member such as a plastic tube that is as long as or slightly shorter than the elastic member 105. The elastic member 105 is received inside the tubular member 106, with one end portion of the elastic member 105 being coupled to the support shaft 103 and with the other end portion of the elastic member 105 being coupled to the weight portion 107. In contrast, the tubular member 106 is not coupled to the support shaft 103 or the weight portion 107. The inside diameter of the tubular member 106 is smaller than the length of the support shaft 103 and the radial dimension of the weight portion 107. Thus, the tubular member 106 continuously stays between the support shaft 103 and the weight portion 107 without slipping off from the elastic member 105.

Figure 19:
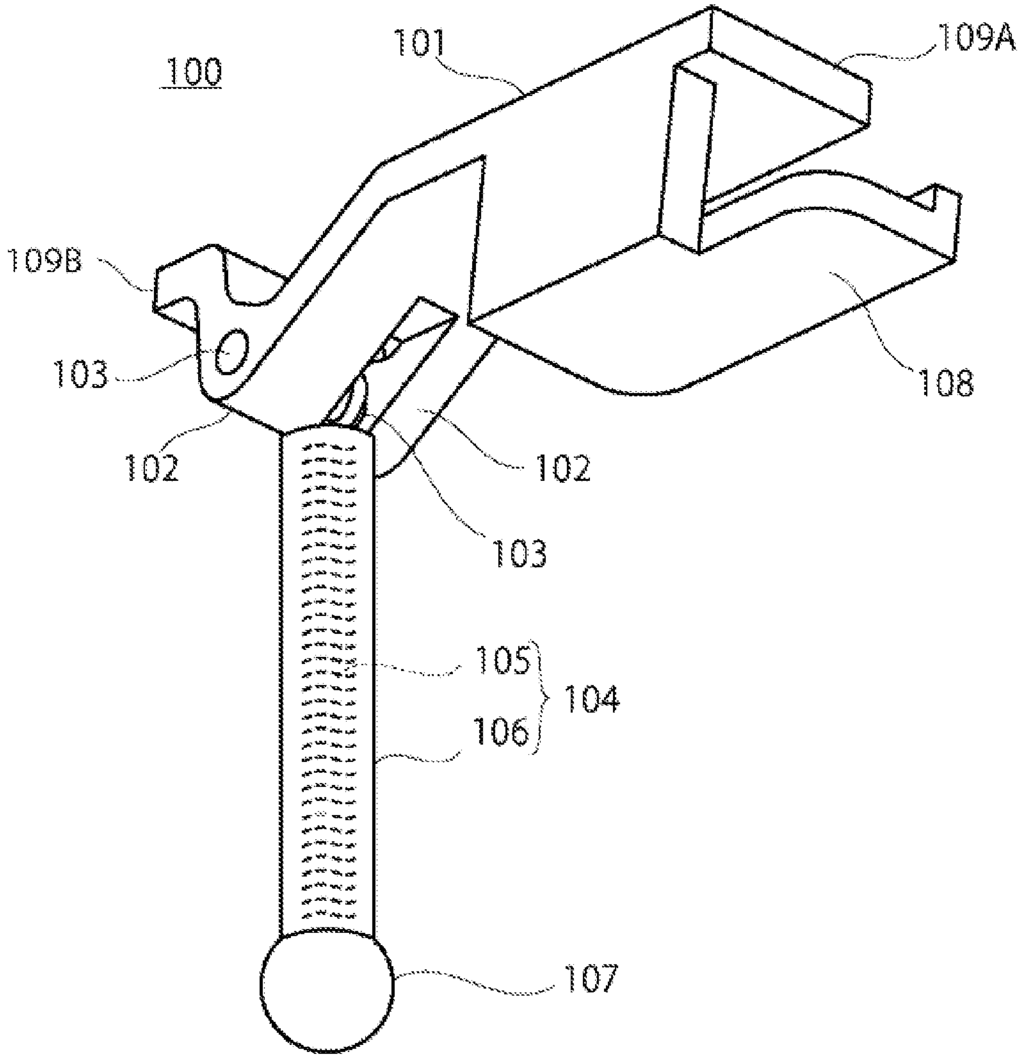
FIG. 19 illustrates a state in which a suspended portion of the tablet moving mechanism is suspended to be swingable.
Figure 20:
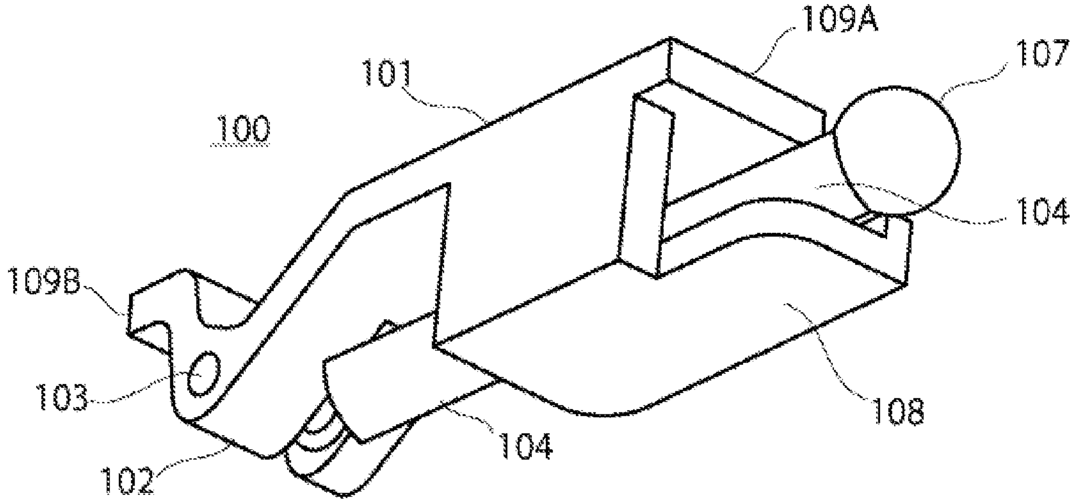
FIG. 20 illustrates a state in which the suspended portion is raised to be held on a placement portion.

The weight portion 107 is a spherical body all made of rubber with soft touch, or a spherical body with its weight being increased by containing a weight member made of metal etc. as a core portion. Such a weight portion 107 and the suspended member 104 discussed above are coupled to the support structure 101 by inserting the support shaft 103 into the shaft support portion 102, assembling the tablet moving mechanism 100 (see FIG. 19). In the tablet moving mechanism 100, as illustrated in FIG. 19, the weight portion 107 and the suspended member 104 are suspended with the weight portion 107 being located at the lowermost position in a free state in which neither the suspended member 104 nor the weight portion 107 is constrained. Meanwhile, as illustrated in FIG. 20, the suspended member 104 is directed horizontally along the lower surface of the lid portion 29 which is provided above the support structure 101 and the weight portion 107 is located close to the lower surface of the lid portion 29 in a state (placed state) in which the suspended member 104, for example, of the suspended member 104 and the weight portion 107, is placed on the retaining portion 108 to be constrained.

The support structure 101 of such a tablet moving mechanism 100 is attached to the lower surface of the lid portion 29 of the tablet container 20 with the shaft support portion 102 being positioned over a path through which the tablet receiving portions 67 are moved during rotation of the rotor 40, or over a movement path of the overhanging portions 52 which is slightly higher. When the suspended member 104 and the weight portion 107 are brought into the free state, both the weight portion 107 and the suspended member 104 are suspended over the movement path of the tablet receiving portions 67 and, further, over the movement path of the overhanging portions 52. The size of the weight portion 107 is preferably larger than the opening size of the tablet receiving portions 67 that have been expanded or the size of the overhanging portions 52, in order to prevent the weight portion 107 from falling into the tablet receiving portions 67 even if the weight portion 107 is detached.

The use and operation of the tablet cassette 10 according to the second embodiment will be described next with reference to the drawings discussed above. It is assumed that the rotor 40 has already been inserted into the tablet container 20, whereby adjustment has been finished to adapt the size of all the tablet receiving portions 67 to the tablets by manually operating the first turning member 70 and the second turning member 60, and the partition unit 30 also has been adjusted to align the partitioning portion 32 etc. In this state, the tablet cassette 10 can be used to contain desired tablets in a random manner and successively discharge the tablets, and thus the tablet containing space 22 of the tablet cassette 10 is replenished with an appropriate amount of tablets by opening the lid portion 29 and inputting the tablets.

When the suspended member 104 is placed on the retaining portion 108 (see FIG. 20), the suspended member 104 is disengaged from the retaining portion 108 so that the suspended member 104 and the weight portion 107 may be moved together with each other. That is, the weight portion 107 is brought into the free state in which the weight portion 107 may be suspended over the movement path of the tablet receiving portions 67 or the overhanging portions 52. If there are no tablets there, the weight portion 107 hangs down. If there are tablets staying there, the weight portion 107 lands on the tablets to be stabilized. Then, the lid portion 29 of the tablet container 20 is closed (see FIG. 16) so that the tablets do not spill out of the tablet containing space 22, and the tablet cassette 10 is mounted to the drive portion (not illustrated).

When the tablet cassette 10 is driven by the drive portion, the rotor 40 is rotated, the first turning member 70 and the second turning member 60 are rotated, and as a result the tablet receiving portions 67 are moved forward with respect to the discharge port 28. The tablets received in the tablet receiving portions 67 and carried under the partitioning portion 32 fall downward one by one through the discharge port 28. In that event, the tablets placed on the rotor 40 roll down from the top of the cap member 50 or the top of the overhanging portions 52 to be received in the tablet receiving portions 67, and the tablets placed on the tablets falling down into the tablet receiving portions 67 are brought closer to the top of the cap member 50 or the top of the overhanging portions 52. All the tablets tend to be moved along a circular or annular path through rotational motion of the rotor 40, although the degree may vary.

With such a tendency, in the case where a large number of tablets are placed on the rotor 40, the tablets may be collectively moved as if the tablets formed a cluster. In the present embodiment, however, the weight portion 107 is positioned over the movement path of the tablets. Therefore, even if a cluster of a plurality of tablets is formed, the cluster of tablets collides against the weight portion 107 to be disentangled quickly and smoothly. As a result, the plurality of tablets successively fall and are then moved onto the rotor 40, rather than staying as a cluster in the space above the rotor 40. The tablets placed on the cap member 50 are moved into the tablet receiving portions 67 or onto the overhanging portions 52 by the slope on the surface of the cap member 50.

When the tablets are successively discharged and there are fewer tablets remaining on the rotor 40, the tablets that have failed to be received in the tablet receiving portions 67 remain on the upper surface of the overhanging portions 52, since the tablets cannot stay on the sloping surface on the cap member 50 or the sloping surface on the inner wall of the tablet container 20. However, the tablets remaining on the overhanging portions 52 pass through the location at which the weight portion 107 of the suspended member 104 is positioned along with rotation of the rotor 40, and thus collide against the weight portion 107 and quickly fall into the tablet receiving portions 67, rather than remaining on the overhanging portions 52. In this manner, the tablets on the overhanging portions 52 of the rotor 40 are tossed by the direct colliding action of the weight portion 107 of the tablet moving mechanism 100 to be reliably moved, thereby efficiently feeding the tablets into the tablet receiving portions 67.

[Modification of Tablet Moving Mechanism 100]

Figure 21:
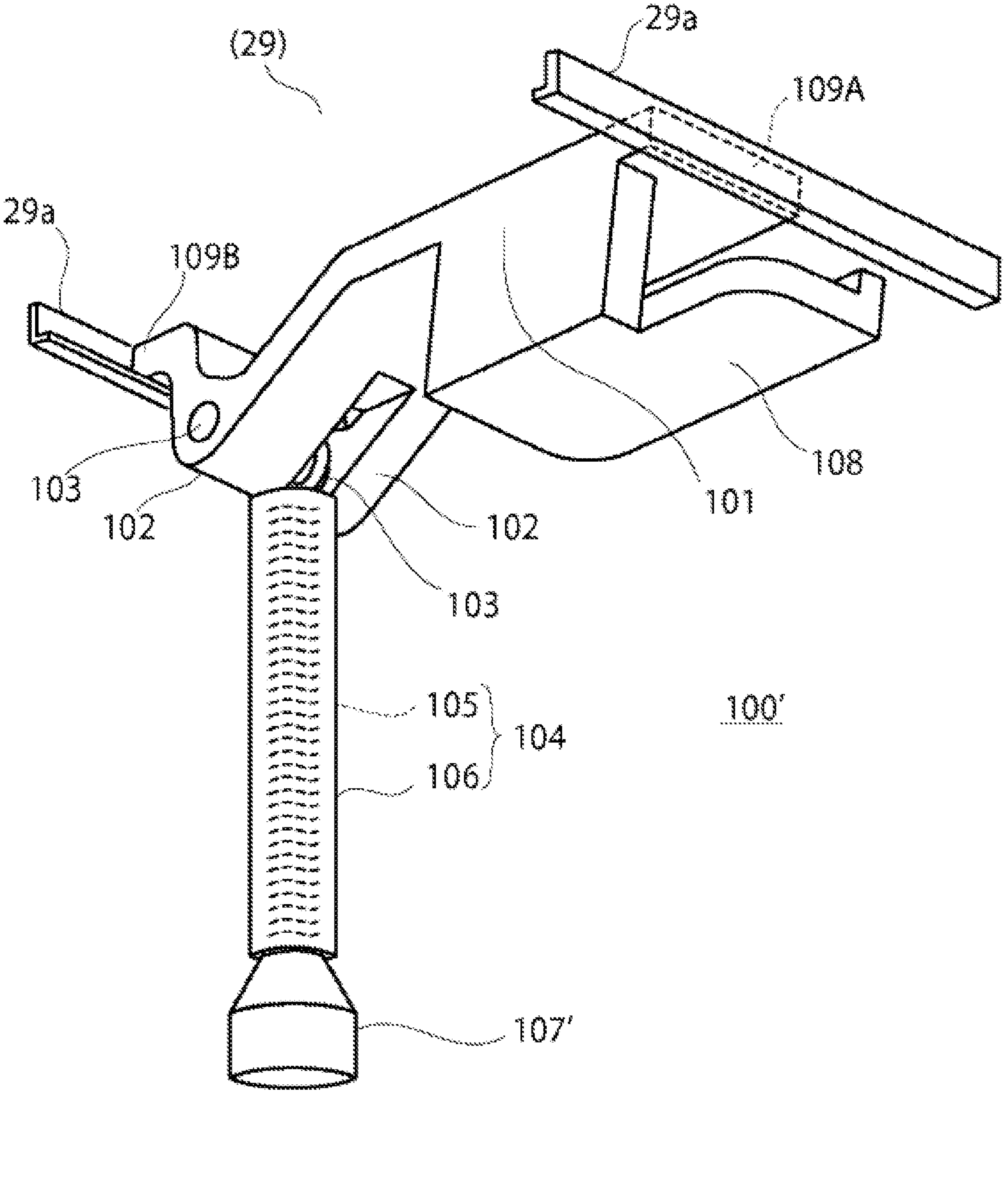
FIG. 21 illustrates the structure of a tablet moving mechanism according to a modification example of the second embodiment.

FIG. 21 is a perspective view illustrating the appearance of another tablet moving mechanism 100'. FIG. 21 illustrates a state in which end portions 109A and 109B of the tablet moving mechanism 100' are retained on a pair of engaging portions 29A attached to the lower surface of the lid portion 29.

The tablet moving mechanism 100' is different from the tablet moving mechanism 100 according to the second embodiment discussed above in that the weight portion 107 which is a spherical body made of rubber is replaced with a weight portion 107' which is a short circular column made of metal and with a circular truncated cone. In this case, the weight portion 107' has an increased weight, and thus provides an increased force to move the tablets.

In the case where the lid portion 29 of the tablet cassette 10 includes the pair of engaging portions 29A, the tablet moving mechanism 100' can be mounted to and removed from the lid portion 29 by retaining and releasing the end portions 109A and 109B of the support structure 101 on and from the engaging portions 29A, and thus the tablet moving mechanism 100' can be readily replaced. Moreover, the lid portion 29 of the container body 21 can be easily replaced, and thus a tablet cassette not equipped with the tablet moving mechanism 100, 100' can be conveniently upgraded to the tablet cassette 10 equipped with the tablet moving mechanism 100, 100'.

In the embodiment described above, the tablet moving mechanism 100 is disposed such that the weight portion 107 is suspended at a location closer to the grip 23 of the tablet container 20 from the position of the axial center of the rotor 40 (see FIG. 1). However, the tablet moving mechanism 100 may be disposed at any position as long as the range of swinging motion of the weight portion 107 is not limited.

Figure 16:
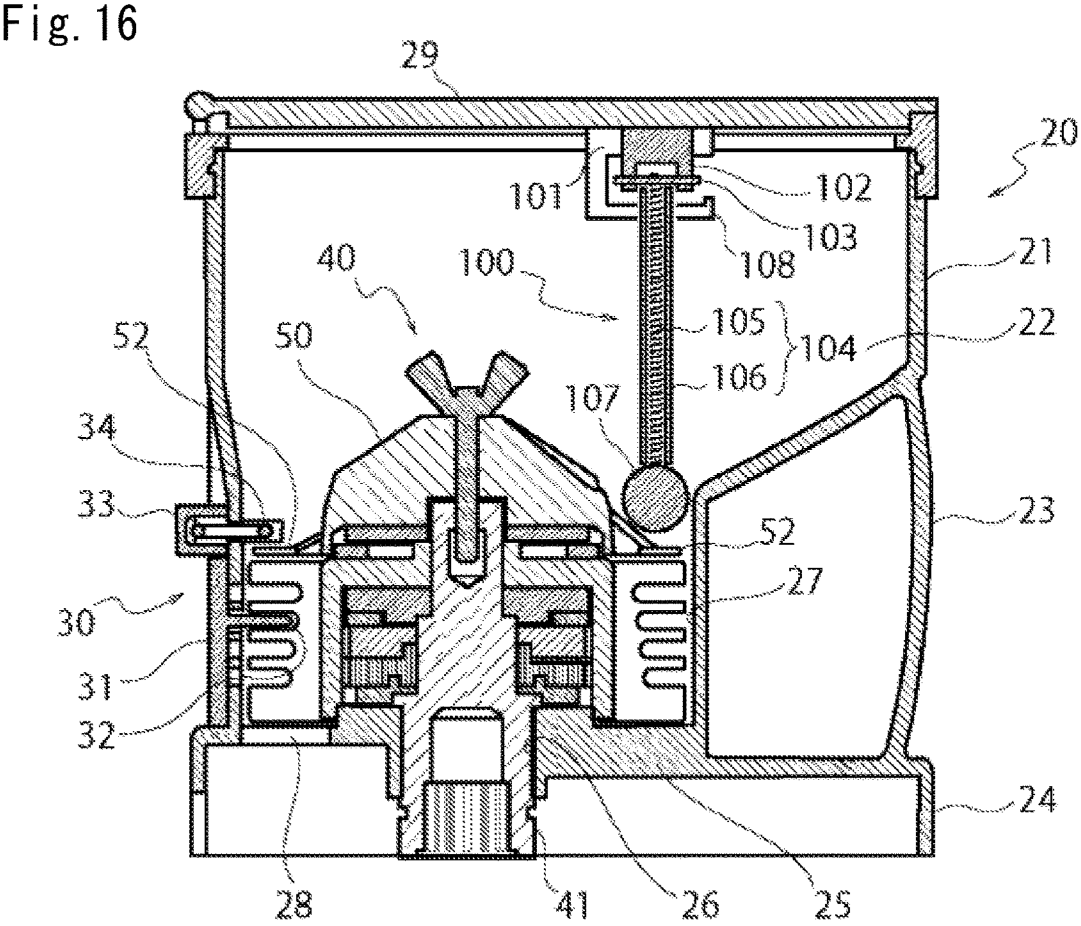
FIG. 16 is a vertical sectional view of a tablet cassette according to a second embodiment of the present invention.
Figure 17:
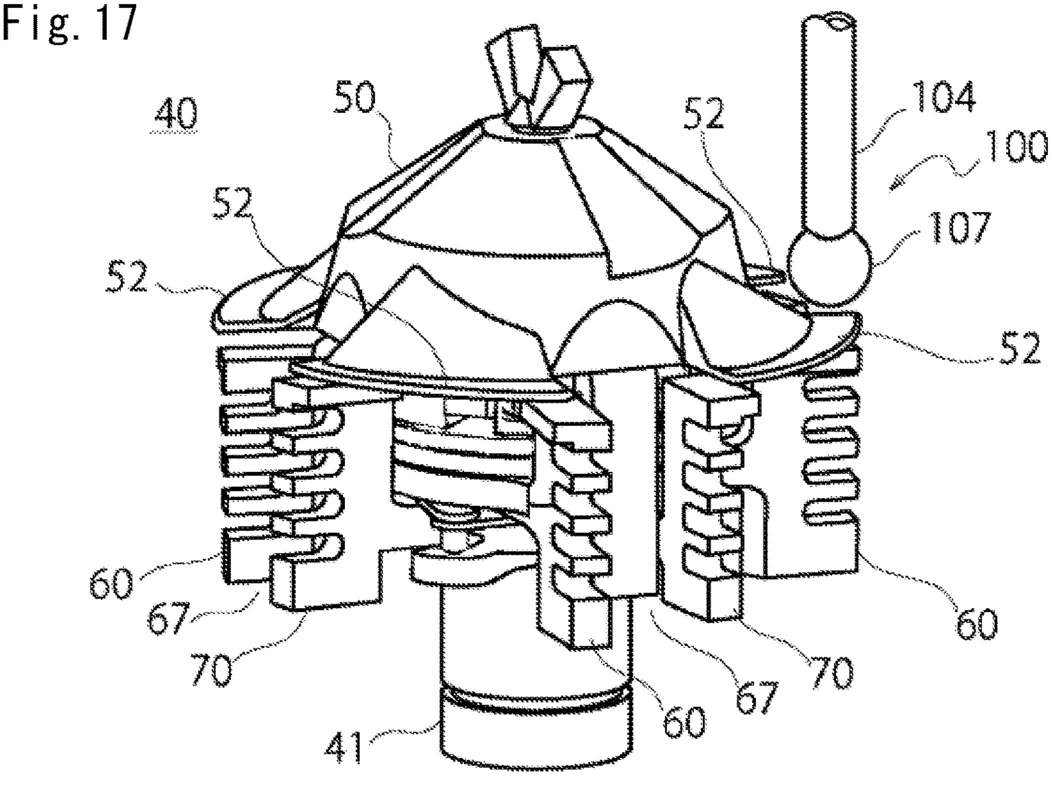
FIG. 17 is a perspective view illustrating the appearance of a rotor and a tablet moving mechanism.

While a location at which the endless belt 34 and the weight portion 107 would interfere with each other, such as a location over the discharge port 28, must be avoided, a wide range of movement of the weight portion 107 can be easily secured on the side upstream of such a location (e.g. the front side of the drawing sheet of FIG. 16) and the side downstream thereof (e.g. the back side of the drawing sheet of FIG. 16). In particular, it is better to dispose the tablet moving mechanism 100 on the downstream side, since the retaining portion 108 can be placed on an overhanging portion in the tablet containing space 22 extending over the grip 23.

In FIG. 20, the retaining portion 108 of the tablet moving mechanism 100 is configured to allow only the suspended member 104, of the suspended member 104 and the weight portion 107, to be placed thereon. However, the retaining portion 108 of the tablet moving mechanism 100 may be configured to allow only the weight portion 107, of the suspended member 104 and the weight portion 107, to be placed thereon, or may be configured to allow both the suspended member 104 and the weight portion 107 to be placed thereon. In any case, both the suspended member 104 and the weight portion 107, which are coupled to each other, take a posture of being suspended or lying along the lid portion 29.

The tablet moving mechanism 100, 100' is considered as a direct tablet moving mechanism configured to directly abut against the tablets to be moved, and can be used in combination with the indirect tablet moving mechanism discussed earlier, since the direct and indirect tablet moving mechanisms are different from each other in the location at which the mechanisms are mounted, the position at which the mechanisms act on the tablets, and the swing motion thereof for the tablets.

INDUSTRIAL APPLICABILITY

The tablet cassette according to the present invention may be used in a device in which a large number of drive portions are incorporated in a storage portion such as the medicine dispensing apparatus discussed earlier, and in a device on which only one drive portion is mounted such as a tablet splitting apparatus. A single tablet cassette may be used as attached to a number of drive portions in an interchangeable manner, or a number of tablet cassettes may be used as attached to a single drive portion in an interchangeable manner. A typical example of the tablets to be handled by the tablet cassette according to the present invention is relatively large, vertically long capsules in a round tube shape. However, the tablets that can be handled are not limited thereto, and a large variety of tablets can be handled, such as tablets in other shapes such as a fusiform shape or a disk shape and tablets of other sizes.

DESCRIPTION OF REFERENCE NUMERALS

10 tablet cassette
20 tablet container
21 container body
22 tablet containing space
23 grip
24 mount-unmount portion
25 bottom wall portion
26 through hole
27 inner peripheral surface
28 discharge port
29 lid portion
30 partition unit
31 partition holding portion
32 partitioning portion
33 belt holding portion
34 endless belt
40 rotor
41 rotary shaft
42 lower end portion
43 intermediate portion
44 upper end portion
46 spacer
47 pressing member
48 setscrew
50 cap member
51 center portion

52 overhanging portion
53 slit
59 circumferential expansion-contraction mechanism
60 second turning member
61 side wall portion
63 groove
64 base portion
65 through hole
66 pin
67 tablet receiving portion
68 through hole
70 first turning member
71 side wall portion
73 groove
74 base portion
75 through hole
76 pin
77 through hole
80 link mechanism
81 stationary link member
82 hook member
83 second link member
84 through hole
85 coupling pin
86 first link member
87 through hole
88 through hole
90 radial expansion-contraction mechanism
91 upper sandwiching member (slide allowing holding member)
92 through groove
93 engaging portion
94 sliding member
95 protrusion
96 scale
97 lower sandwiching member (slide allowing holding member)
98 guide path
99 engaging portion
100 tablet moving mechanism
101 support structure
102 shaft support portion
103 support shaft
104 suspended member
105 elastic member (coil spring)
106 tubular member
107, 107 weight portion
108 retaining portion
109A, 109B end portion

The invention claimed is:

1. A tablet cassette comprising:

a tablet container having a tablet containing space therein for containing a plurality of tablets in a random manner, the tablet container including a bottom wall portion formed with a discharge port to allow the plurality of tablets in the tablet containing space to fall down one by one;

a rotary shaft having an axial line extending in a direction orthogonal to the bottom wall portion of the tablet container; and a rotor operable to rotate about the axial line in the tablet containing space of the tablet container along with rotation of the rotary shaft, the rotor including a plurality of tablet receiving portions configured to receive the tablets one by one and allow the tablets to pass therethrough to the discharge port, wherein:

the plurality of tablet receiving portions each include a radially opening portion that opens in a radial direction of the rotary shaft, a pair of axially opening portions that open on both sides in an axial direction in which the axial line extends, a facing wall portion that faces the radially opening portion, and a pair of side wall portions that face each other in a circumferential direction of the rotary shaft; and the rotor includes a circumferential expansion-contraction mechanism externally mounted on the rotary shaft to expand and contract the plurality of tablet receiving portions in the circumferential direction in conjunction with each other, a radial expansion-contraction mechanism externally mounted on the rotary shaft and including a plurality of sliding members respectively provided for the plurality of tablet receiving portions, the plurality of sliding members each including the facing wall portion at one end thereof and being slidable in the radial direction of the rotary shaft to individually move the facing wall portion in the radial direction, and a slide allowing holding member configured to hold the plurality of sliding members to be slidable in the radial direction, and a constraining mechanism configured to prevent the plurality of sliding members from sliding with respect to the slide allowing holding member; and wherein the constraining mechanism includes a pressing member to be pressed against the plurality of sliding members to hinder sliding of the plurality of sliding members;

the slide allowing holding member includes a pair of sandwiching members configured to hold the plurality of sliding members by sandwiching sliding portions of the sliding members at both sides in the axial direction; and one of the pair of sandwiching members located on a pressing member side includes a plurality of through grooves formed to expose a part of the plurality of sliding members to be able to contact the pressing member.

2. The tablet cassette according to claim 1, wherein:

the radial expansion-contraction mechanism is disposed on the circumferential expansion-contraction mechanism such that the plurality of facing wall portions are inserted into the plurality of tablet receiving portions; and the constraining mechanism further includes a cap member mounted to the rotary shaft to press the pressing member disposed on the radial expansion-contraction mechanism toward the plurality of sliding members.

3. The tablet cassette according to claim 1, wherein:

a protrusion is provided at an other end of each of the plurality of sliding members, the protrusion being configured to be located in a corresponding one of the through grooves to be pressed by the pressing member; and the through grooves and the protrusions are shaped such that the sliding members are slidable only in the radial direction when the protrusions are not pressed by the pressing member.

4. The tablet cassette according to claim 3, wherein the through grooves extend in the radial direction to a position on an inner side with respect to an outer peripheral edge of the one of the sandwiching members.

5. The tablet cassette according to claim 4, wherein a scale is provided on respective surfaces of the sliding members that face the one of the sandwiching members to indicate an amount of projection from the outer peripheral edge of the one of the sandwiching members.

6. The tablet cassette according to claim 1, wherein:

the circumferential expansion-contraction mechanism includes a first turning member including one side wall portion of the pairs of side wall portions disposed at predetermined intervals in the circumferential direction, and operable to relatively turn about the axial line within a predetermined angular range, a second turning member including an other side wall portion of the pairs of side wall portions disposed at predetermined intervals in the circumferential direction, and operable to relatively turn about the axial line within the predetermined angular range, and a link mechanism configured to couple the first turning member and the second turning member in an interlocking manner; and the link mechanism is configured such that, when one of the second turning member and the first turning member is turned toward one side in the circumferential direction by a predetermined angle through a manual operation, an other of the second turning member and the first turning member is turned toward an other side in the circumferential direction by an angle equal to the predetermined angle.

7. The tablet cassette according to claim 6, wherein:

the link mechanism includes a stationary link member provided to be non-rotatable in the circumferential direction with respect to the rotary shaft, a first link member, one end of which is coupled to the first turning member by a first turning pair, a second link member, one end of which is coupled to the second turning member by a second turning pair, a third turning pair configured to couple the other end of the first link member and the other end of the second link member, a first sliding pair provided between the stationary link member and the third turning pair to allow the third turning pair to slide over a predetermined range in the radial direction of the rotary shaft, a second sliding pair provided between the first turning pair and the second turning member, and a third sliding pair provided between the second turning pair and the first turning member; and the stationary link member, the first link member, the second link member, and the first to third sliding pairs are configured such that, when one of the first turning member and the second turning member is turned over a predetermined angle in one direction about the axial line of the rotary shaft, an other of the first turning member and the second turning member is turned over the predetermined angle in an other direction opposite to the one direction.

8. A tablet cassette comprising:

a tablet container having a tablet containing space therein for containing a plurality of tablets in a random manner, the tablet container including a bottom wall portion formed with a discharge port to allow the plurality of tablets in the tablet containing space to fall down one by one;

a rotary shaft having an axial line extending in a direction orthogonal to the bottom wall portion of the tablet container; and a rotor operable to rotate about the axial line in the tablet containing space of the tablet container along with rotation of the rotary shaft, the rotor including a plurality of tablet receiving portions configured to receive the tablets one by one and allow the tablets to pass therethrough to the discharge port, wherein:

the plurality of tablet receiving portions each include a radially opening portion that opens in a radial direction of the rotary shaft, a pair of axially opening portions that open on both sides in an axial direction in which the axial line extends, a facing wall portion that faces the radially opening portion, and a pair of side wall portions that face each other in a circumferential direction of the rotary shaft; and the rotor includes a circumferential expansion-contraction mechanism externally mounted on the rotary shaft to expand and contract the plurality of tablet receiving portions in the circumferential direction in conjunction with each other, a radial expansion-contraction mechanism externally mounted on the rotary shaft and including a plurality of sliding members respectively provided for the plurality of tablet receiving portions, the plurality of sliding members each including the facing wall portion at one end thereof and being slidable in the radial direction of the rotary shaft to individually move the facing wall portion in the radial direction, and a slide allowing holding member configured to hold the plurality of sliding members to be slidable in the radial direction, and a constraining mechanism configured to prevent the plurality of sliding members from sliding with respect to the slide allowing holding member; and wherein the radial expansion-contraction mechanism is disposed on the circumferential expansion-contraction mechanism such that the plurality of facing wall portions are inserted into the plurality of tablet receiving portions; and the constraining mechanism further includes a cap member mounted to the rotary shaft to press a pressing member disposed on the radial expansion-contraction mechanism toward the plurality of sliding members; and a lid portion of the tablet container is provided with a suspended member suspended from the lid portion to contact the tablets on the rotor to move the tablets; and a tablet moving mechanism is constituted from the suspended member, a support structure provided on a lower surface of the lid portion to swingably support the suspended member, and a weight portion provided at a free end portion of the suspended member.

9. The tablet cassette according to claim 8, wherein:

the cap member is shaped to stir tablets in the tablet containing space;

the cap member is provided with a plurality of overhanging portions extending in the radial direction except for areas above the plurality of tablet receiving portions; and the support structure is structured such that the suspended member is suspended to a position at which the suspended member contacts the tablets remaining on the overhanging portions to cause the tablets to fall into the tablet receiving portions.

10. The tablet cassette according to claim 9, wherein the suspended member is structured to be elastically deformed according to displacement of the weight portion.

11. The tablet cassette according to claim 10, wherein the suspended member includes a flexible tubular member and an elongated elastic member housed in a cavity of the tubular member.

12. The tablet cassette according to claim 11, wherein the elastic member is a coil spring, and the weight portion is coupled to the coil spring but is not coupled to the tubular member.

13. The tablet cassette according to claim 10, wherein:

a retaining portion on which at least one of the suspended member and the weight portion is retained is provided on the lower surface of the lid portion; and the support structure is configured such that the suspended member which has been released from the retaining portion is gradually brought into a suspended state as the tablets in the tablet containing space are decreased.

14. The tablet cassette according to claim 8, wherein the weight portion is suspended over a movement path of the plurality of tablet receiving portions when the suspended member is suspended by only a weight of the weight portion.

15. The tablet cassette according to claim 11, wherein:

a retaining portion on which at least one of the suspended member and the weight portion is retained is provided on the lower surface of the lid portion; and the support structure is configured such that the suspended member which has been released from the retaining portion is gradually brought into a suspended state as the tablets in the tablet containing space are decreased.

16. The tablet cassette according to claim 12, wherein:

a retaining portion on which at least one of the suspended member and the weight portion is retained is provided on the lower surface of the lid portion; and the support structure is configured such that the suspended member which has been released from the retaining portion is gradually brought into a suspended state as the tablets in the tablet containing space are decreased.

* * * * *